US008134723B2

(12) United States Patent  
Shimizu

(10) Patent No.: US 8,134,723 B2  
(45) Date of Patent: Mar. 13, 2012

(54) INFORMATION PROCESSING APPARATUS, AND METHOD DISCRIMINATING BETWEEN SHEET FEED FROM CASSETTE AND MANUAL PORT, AND IMAGE TRANSFER BASED THEREON

(75) Inventor: Masaaki Shimizu, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/442,309

(22) Filed: May 30, 2006

(65) Prior Publication Data

US 2006/0275070 A1 Dec. 7, 2006

(30) Foreign Application Priority Data

Jun. 6, 2005 (JP) .................................. 2005-166167  
May 17, 2006 (JP) .................................. 2006-138239

(51) Int. Cl. *G06K 15/00* (2006.01)
(52) U.S. Cl. ....... 358/1.14; 358/1.15; 358/1.1; 358/498; 101/118; 347/153; 271/4.02; 271/136; 271/242
(58) Field of Classification Search ................. 358/1.14, 358/1.15, 1.1, 498; 101/118; 271/4.02, 136, 271/242; 347/153

See application file for complete search history.

(56) References Cited

U.S. PATENT DOCUMENTS 5,706,411 A * 1/1998 McCormick et al. ........ 358/1.14

(Continued)

FOREIGN PATENT DOCUMENTS

JP 1-69431 3/1989

(Continued)

OTHER PUBLICATIONS

Japanese Office Action issued by the Japanese Patent Office on Mar. 18, 2011, in Japanese Patent Application No. 2006-138239.

*Primary Examiner* — Jacky X Zheng  
(74) *Attorney, Agent, or Firm* — Fitzpatrick, Cella, Harper & Scinto

(57) ABSTRACT

An information processing apparatus which controls a host-based printer includes a determination portion which determines designation of feed from a feed unit or manual feed port, a display control portion which, when it is determined that feed from the manual feed port is designated, causes a display portion to display a display to prompt the operator to insert a print medium into the manual feed port, an identification portion which identifies compressed-image data transfer permission corresponding a user instruction, and a transfer portion which transfers compressed image data of one page to the host-based printer.

9 Claims, 21 Drawing Sheets

U.S. PATENT DOCUMENTS

| | | | |
|---|---|---|---|
| 6,654,137 B1 * | 11/2003 | Yagita | 358/1.15 |
| 2002/0051161 A1 * | 5/2002 | Kanazawa et al. | 358/1.12 |
| 2002/0067499 A1 * | 6/2002 | Sakamoto et al. | 358/1.14 |
| 2004/0174552 A1 * | 9/2004 | Miyake et al. | 358/1.12 |
| 2005/0243357 A1 * | 11/2005 | Sugita | 358/1.13 |
| 2007/0189830 A1 * | 8/2007 | Nishikawa | 400/605 |

FOREIGN PATENT DOCUMENTS

| | | |
|---|---|---|
| JP | 08-324843 A | 12/1996 |
| JP | 11-316660 | 11/1999 |
| JP | 2001-138607 A | 5/2001 |
| JP | 2002-132472 A | 5/2002 |

* cited by examiner

FIG. 8

PRINTER SETUP

PRINTER
- PRINTER NAME (N): L3000
- STATUS: READY
- TYPE: L3000
- LOCATION: USB001
- COMMENT:

PROPERTIES (P)...

PRINT ORIENTATION
- ⊙ PORTRAIT (O)
- ○ LANDSCAPE (A)

PAPER
- SIZE (Z): A4
- HOW TO FEED (S): 1-SHEET MANUAL FEED

OK        CANCEL

NETWORK (W)...

| L3000 | | □ ◻ ✕ |
|---|---|---|
| JOB(J) OPTIONS(S) HELP(H) | | |

⚠ PAPER JAMS.

DON'T PULL OUT JAMMED PAPER BY FORCE, AND PLEASE REMOVE JAMMED PAPER ACCORDING TO FOLLOWING PROCEDURES.
1. OPEN UPPER COVER AND REMOVE TONER CARTRIDGE.
2. CHECK FEED PORTION, DELIVERY PORTION, AND INTERIOR OF MAIN BODY, AND REMOVE JAMMED PAPER.
   • WHEN REMOVING PAPER, DON'T TOUCH TRANSFER ROLLER.
3. ATTACH TONER CARTRIDGE AND CLOSE UPPER COVER.

| JOB DURING PRINTING | MY JOB OPERATION |
|---|---|

END OF PRINTING 0/1 PAGE.

| TITLE | CONTENTS |
|---|---|
| DOCUMENT NAME | PROPOSAL |
| USER NAME | 017131 |
| COMPUTER NAME | A-2002-P18802 |

USB001

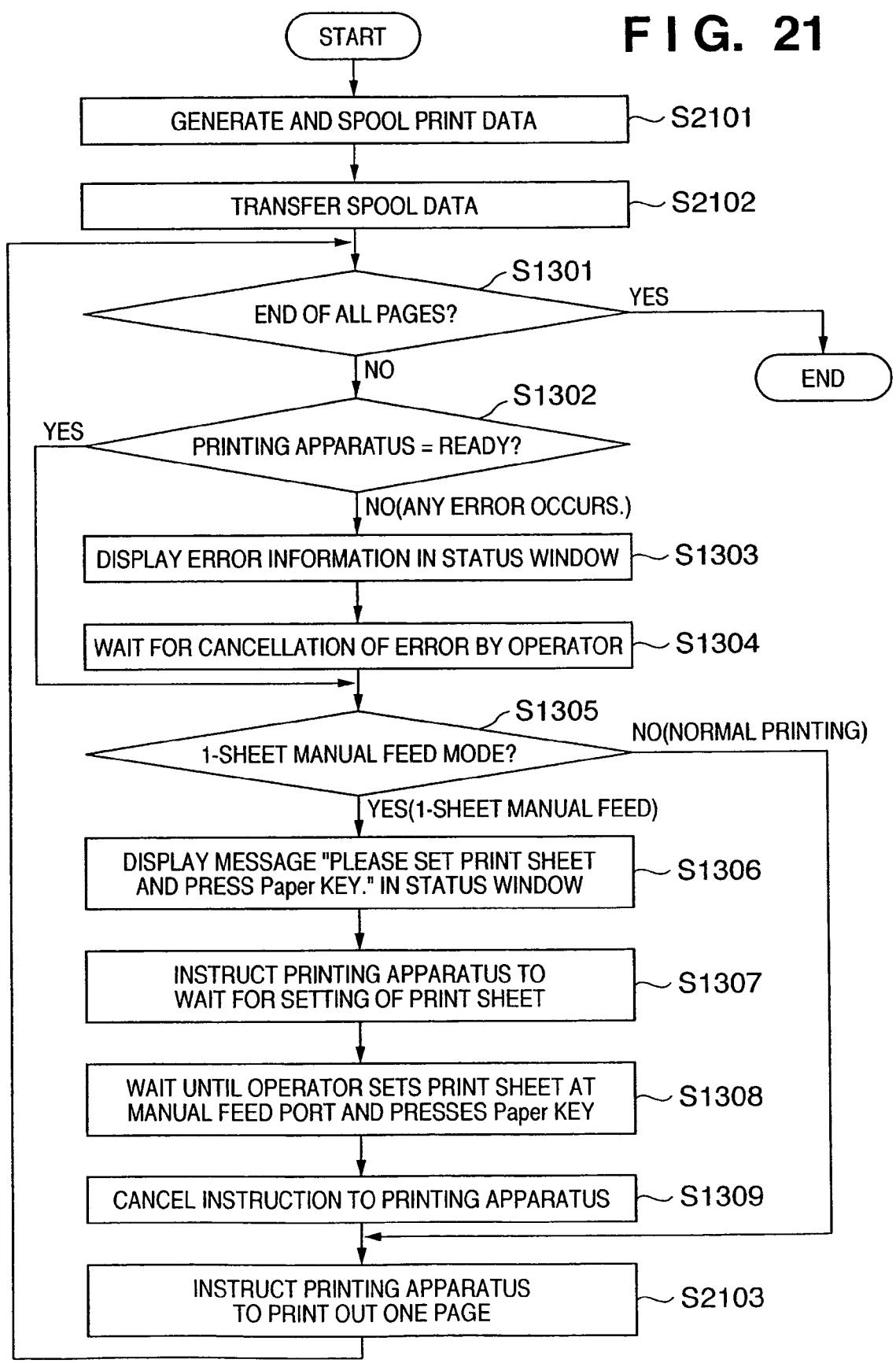

INFORMATION PROCESSING APPARATUS, AND METHOD DISCRIMINATING BETWEEN SHEET FEED FROM CASSETTE AND MANUAL PORT, AND IMAGE TRANSFER BASED THEREON

FIELD OF THE INVENTION

The present invention relates to an information processing apparatus, information processing method, and host-based printer.

BACKGROUND OF THE INVENTION

Recently, demands for low-end compact printing apparatuses are increasing, and further cost reduction is required.

In order to prevent erroneous conveyance of a print sheet loaded in the feed cassette instead of a print sheet which should be originally fed from the manual feed port, there is proposed an example of the configuration of a printing apparatus and host computer in which an offline job command is embedded in data transmitted from the host computer, and the printer CPU interprets the command to stop the operation of the printing apparatus on the basis of the interpretation so as to prevent an execution timing error between printing and feed of a print sheet to the manual feed port (e.g., Japanese Patent Laid-Open No. 11-316660).

Japanese Patent Laid-Open No. 01-069431 discloses an example in which the feed cassette and manual feed port are mechanically switched to prevent erroneous conveyance of a print sheet.

However, in adjusting the timing from the feed port, the techniques in Japanese Patent Laid-Open Nos. 11-316660 and 01-069431 inhibit implementation of the above-mentioned low-end compact printing apparatus.

For example, in implementing the low-end compact printing apparatus, low cost can be achieved by arranging, as a mechanism compatible with cost reduction, a portion common to the convey path of a print sheet supplied from the feed cassette and that of a print sheet supplied from the manual feed port.

In Japanese Patent Laid-Open No. 01-069431, an expensive CPU is essential to interpret an offline command by the printer CPU. In order to implement a dedicated sensor and a configuration for mechanically switching between the feed cassette and the manual feed port, the number of components inevitably increases, and a dedicated signal processing circuit, a driving source and control circuit for driving the mechanism, and accessory software are indispensable. If the printing apparatus employs this configuration, cost reduction is limited.

SUMMARY OF THE INVENTION

The present invention has been made to overcome the conventional drawbacks, and has as its object to provide a printing technique of reliably printing by feeding a print sheet from the manual feed port as desired by the operator with the configuration of a low-cost printing apparatus.

In order to achieve the above object, an information processing apparatus according to the present invention is characterized by mainly comprising the following arrangement.

According to the present invention, an information processing apparatus which controls a host-based printer that can print each page on a print medium loaded in a feed unit or a print medium inserted from a manual feed port on the basis of compressed image data of each page and uses a common sensor to detect the print media loaded in the feed unit and the manual feed port, comprising:

a determination unit adapted to determine designation of feed from the feed unit or the manual feed port;

a display control unit adapted to, when said determination unit determines that feed from the manual feed port is designated, cause a display portion to display a display to prompt insertion of a print medium into the manual feed port;

an identification unit adapted to identify compressed-image data transfer permission corresponding to a user instruction; and a transfer unit adapted to transfer compressed image data of one corresponding page to the host-based printer on the basis of the identification by said identification unit, wherein in a process for compressed image data of each page that has not been transferred to the host-based printer after a print process of said one page, said display control unit causes the display portion to display again the display to prompt insertion of a print medium into the manual feed port.

According to the present invention, an information processing apparatus capable of communicating with a host-based printer which uses a common sensor to detect print media loaded in a feed unit and a manual feed port, comprising:

an input unit adapted to accept an instruction for either of a first feed mode and a second feed mode;

a first display control unit adapted to, when the first feed mode is designated, cause a display portion to display a message to prompt insertion of a print sheet into the manual feed port;

a first control unit adapted to, when print data transfer permission corresponding to a user instruction is identified, cause the host-based printer to print out print data of one page or two pages without causing the host-based printer to print out all pages;

a second display control unit adapted to display again the message to prompt insertion of a print sheet in response to printout performed by said first control unit; and a second control unit adapted to cause, in response to a notification from the host-based printer, the host-based printer to print out one remaining page or two remaining pages which are not printed out.

According to the present invention, a host-based printer which can print each page on a print medium loaded in a feed unit or a print medium inserted from a manual feed port on the basis of compressed image data of each page, and uses a common sensor to detect the print media loaded in the feed unit and the manual feed port, comprising:

a display unit adapted to display a display to prompt insertion of a print medium into the manual feed port on the basis of an instruction which is transmitted from an information processing apparatus and represents printing by feed from the manual feed port;

a notification input unit adapted to input a notification for causing the information processing apparatus to identify that compressed image data can be transferred; and a printing unit adapted to decompress the compressed image data of each page transferred from the information processing apparatus in correspondence with the notification, and perform a print process on the basis of the decompressed data.

According to the present invention, printing can be reliably performed by feeding a print sheet from the manual feed port as desired by the operator with the configuration of a low-cost printing apparatus.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view illustrating a feed method designation window;

FIG. 17 is a view showing still another example of displaying the state of the printing apparatus on the display device of the host computer;

FIG. 21 is a flowchart for explaining the flow of print control in the printing apparatus and host computer according to the third embodiment.

DETAILED DESCRIPTION OF THE PREFERRED EMBODIMENTS

Preferred embodiments of the present invention will now be described in detail in accordance with the accompanying drawings.

First Embodiment

The first embodiment of the present invention will be described below with reference to the accompanying drawings. In the following description, a laser beam printer will be exemplified as a printing apparatus. However, the gist of the present invention is not limited to this, and is also effective for a printing apparatus having an LED array, liquid crystal shutter, or the like as a light-emitting element. A printing apparatus using an electrophotographic process will be exemplified as a print mechanism. However, the gist of the present invention is not limited to this print mechanism, and is also effective for any print mechanism (ink-jet, serial, thermal transfer, or the like) as far as the print mechanism can print page by page on print media supplied from the manual feed port.

Figure 1:
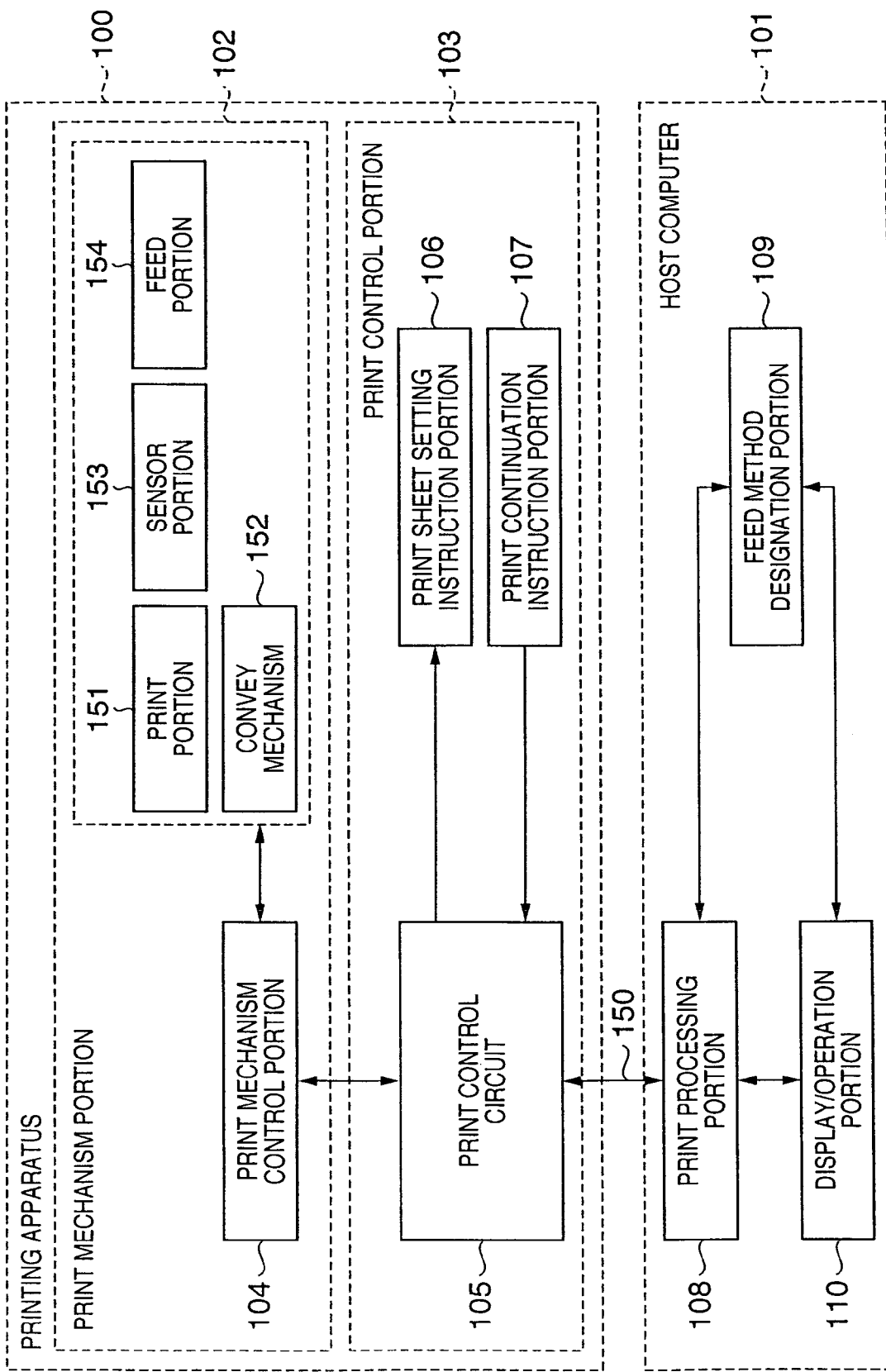
FIG. 1 is a block diagram showing the schematic configuration of a print information processing system which includes a host computer and printing apparatus.

FIG. 1 is a block diagram showing the schematic configuration of a print information processing system which includes a host computer 101 and printing apparatus 100. In FIG. 1, the host computer (information processing apparatus) 101 is exemplified by a personal computer or workstation.

Image data of each page which is expanded on the basis of application data in the host computer is sent to the printing apparatus without or after compressing the image data. When the received image data is compressed, the printing apparatus decompresses the compressed image data, converts the decompressed image data into a video signal, and prints page by page. In some cases, the printing apparatus changes image data identified for each page into a 2in1 layout, and prints on the basis of the image data having undergone the layout process. A printing apparatus specialized in image output is called a "host-based printer". In the embodiment of the present invention, the printing apparatus 100 is assumed to be a host-based printer. A form in which the host computer generates image data, instead of interpreting an advanced-function drawing command such as PostScript available from Adobe Systems by the printer to generate image data, is also called the host-based printer.

When a raster image transmitted to the host-based printer is expanded, drawing data such as a character, graphics, and photograph which are created by application software (to be simply referred to as an "application" hereinafter) of the host computer 101 are temporarily spooled as a spool file in the virtual page memory of the host computer 101 via the drawing module (GDI (Graphic Device Interface) in the Windows® OS) of an operating system (OS). After that, the spool file is read out and expanded by the printer driver or the drawing module of the OS, and the resultant data is transmitted to the printing apparatus 100.

The printing apparatus 100 is formed from a print mechanism portion 102 and print control portion 103. The print mechanism portion 102 comprises a print mechanism 151 which prints on a print medium on the basis of data received from the host computer 101, a convey mechanism 152 which conveys a print medium, a feed portion (feed cassette (including a feed tray (MPT): this also applies to the following description), and manual feed port) 154 which supplies a print medium, a sensor portion 153 which detects the presence/absence of a print medium, and a print mechanism control portion 104 which controls the operations of these portions.

The print control portion 103 comprises a print control circuit 105, print sheet setting instruction portion 106, and print continuation instruction portion 107. When the print control circuit 105 receives expanded raster image data (to be also referred to as "printout data" hereinafter) from the host computer 101, it converts the printout data into a video signal, and transmits the video signal to the print mechanism control portion 104. Upon reception of the video signal, the print mechanism control portion 104 operates the print portion 151, convey mechanism 152, and the like in order to execute printing complying with the video signal.

The print control circuit 105 receives, from the print mechanism control portion 104, status information of the print portion 151, convey mechanism 152, feed portion 154, and the like in the print mechanism portion 102 that is detected by the sensor portion 153. The print control circuit 105 transmits the status information to the host computer 101 via a bidirectional interface 150 which connects the printing apparatus 100 and host computer 101.

When the operator designates 1-sheet manual feed via a feed method designation portion 109 of the host computer 101, the print sheet setting instruction portion 106 controls a display and instruction for prompting the operator to set a print medium (to be referred to as a "print sheet" hereinafter) at the manual feed port.

The print continuation instruction portion 107 notifies the host computer 101 that the operator set a print sheet at the manual feed port, and receives and processes an instruction to continue transmission of printout data.

When the operator designates 1-sheet manual feed via the feed method designation portion 109 (to be described later), and causes the printing apparatus 100 to execute printing, the host computer 101 outputs, from a print processing portion 108 (to be described later) to the print control circuit 105, a request to set a print sheet at the manual feed port.

When the print control circuit 105 receives, from the print processing portion 108, the request to set a print sheet at the manual feed port, it causes the print sheet setting instruction portion 106 to flicker, e.g., an LED (see a Paper LED 903 in FIG. 9) on the operation panel of the printing apparatus 100, and prompts the operator to set a print sheet at the manual feed port. Although the LED will be exemplified, a 16-character LED or the like is available in terms of cost reduction.

After the operator sets a print sheet at a manual feed port 305 upon reception of the instruction from the print sheet setting instruction portion 106, he notifies the printing apparatus 100 via the print continuation instruction portion 107 that the print sheet is ready. For example, after setting a print sheet, the operator presses an operation key (see a Paper key in FIG. 9) on the operation panel of the printing apparatus 100 to notify the printing apparatus 100 that setting of the print sheet is completed. The notification to the printing apparatus 100 is processed as a print continuation instruction by the print continuation instruction portion 107.

When the print continuation instruction portion 107 is notified that a print sheet is set, and is instructed by the operator to continue printing, it notifies the print control circuit 105 of the information (to be referred to as "print continuation instruction information" hereinafter). The print control circuit 105 notifies the print processing portion 108 of the host computer 101 of the print continuation instruction information. Upon reception of the print continuation instruction information from the print control circuit 105, the print processing portion 108 transmits printout data.

The above operation is repeated for each page until all pages of a print product designated by the operator are printed out.

Note that the functions of the print mechanism control portion 104, print control circuit 105, print sheet setting instruction portion 106, and print continuation instruction portion 107 are implemented by combinations of control software and hardware (e.g., a display device and input device) mainly under the overall control of the CPU (not shown).

The print processing portion 108 which forms the host computer 101 can generate printout data for each page, transmit the data to the printing apparatus 100, and receive status information of the printing apparatus 100 that is sent back from the printing apparatus 100.

In accordance with a feed method (whether the manual feed port is designated) designated by the feed method designation portion 109, the print processing portion 108 controls the method of transferring printout data to the printing apparatus 100. That is, when the operator designates feed of print sheets set in the feed cassette, the print processing portion 108 successively prints all pages of printout data.

When the operator designates 1-sheet manual feed, the print processing portion 108 prompts the operator to set a print sheet at the manual feed port for each page of printout data. After the operator sets a print sheet and designates continuation of printing via the print continuation instruction portion 107, the print processing portion 108 transmits printout data of the target page to the printing apparatus 100, and causes it to execute printing.

When the operator executes printing, the feed method designation portion 109 designates one of feed methods. The feed method designation portion 109 is configured to prompt the operator to designate a feed method with an input device such as a keyboard or mouse.

Figure 15:
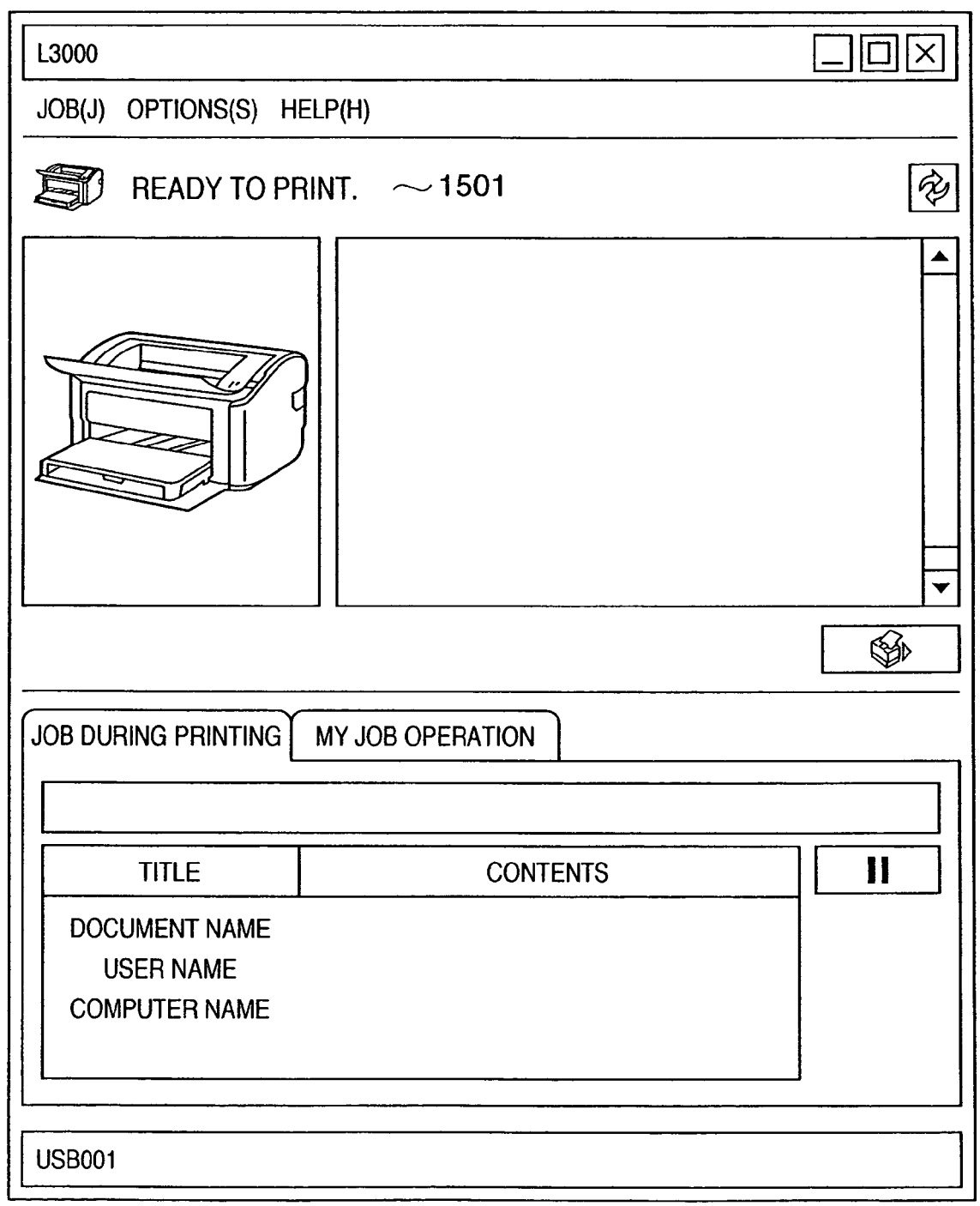
FIG. 15 is a view showing an example of displaying the state of the printing apparatus on the display device of the host computer.

Reference numeral 110 denotes a display/operation portion in the host computer 101. The display/operation portion 110 is generally made up of a CRT or the like as the display device, and a keyboard and pointing device as the operation device. The display/operation portion 110 performs control to display status information of the printing apparatus 100, which is sent back from the printing apparatus 100, on the display device of the host computer 101 in a display form as shown in FIG. 15 (print ready state), FIG. 16 (state during printing), or FIG. 17 (error state due to paper jam).

Figure 11:
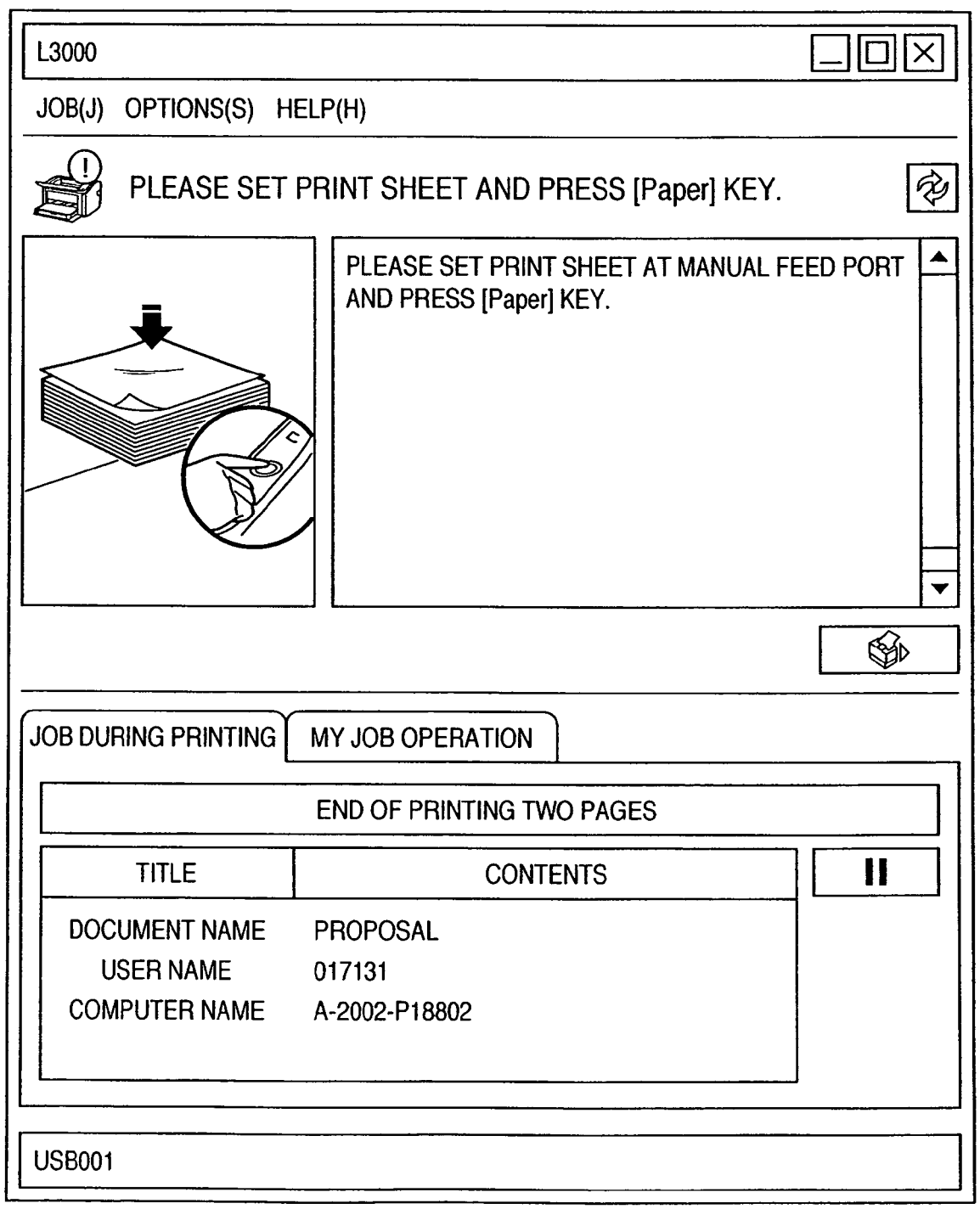
FIG. 11 is a view showing an example of a window which prompts the operator to set a print sheet in 1-sheet manual feed designation.

When the operator designates 1-sheet manual feed, for example, a message window as shown in FIG. 11 is displayed on the display device of the host computer 101 to also prompt the operator from the window to set a paper sheet at the 1-sheet manual feed port.

Figure 10:
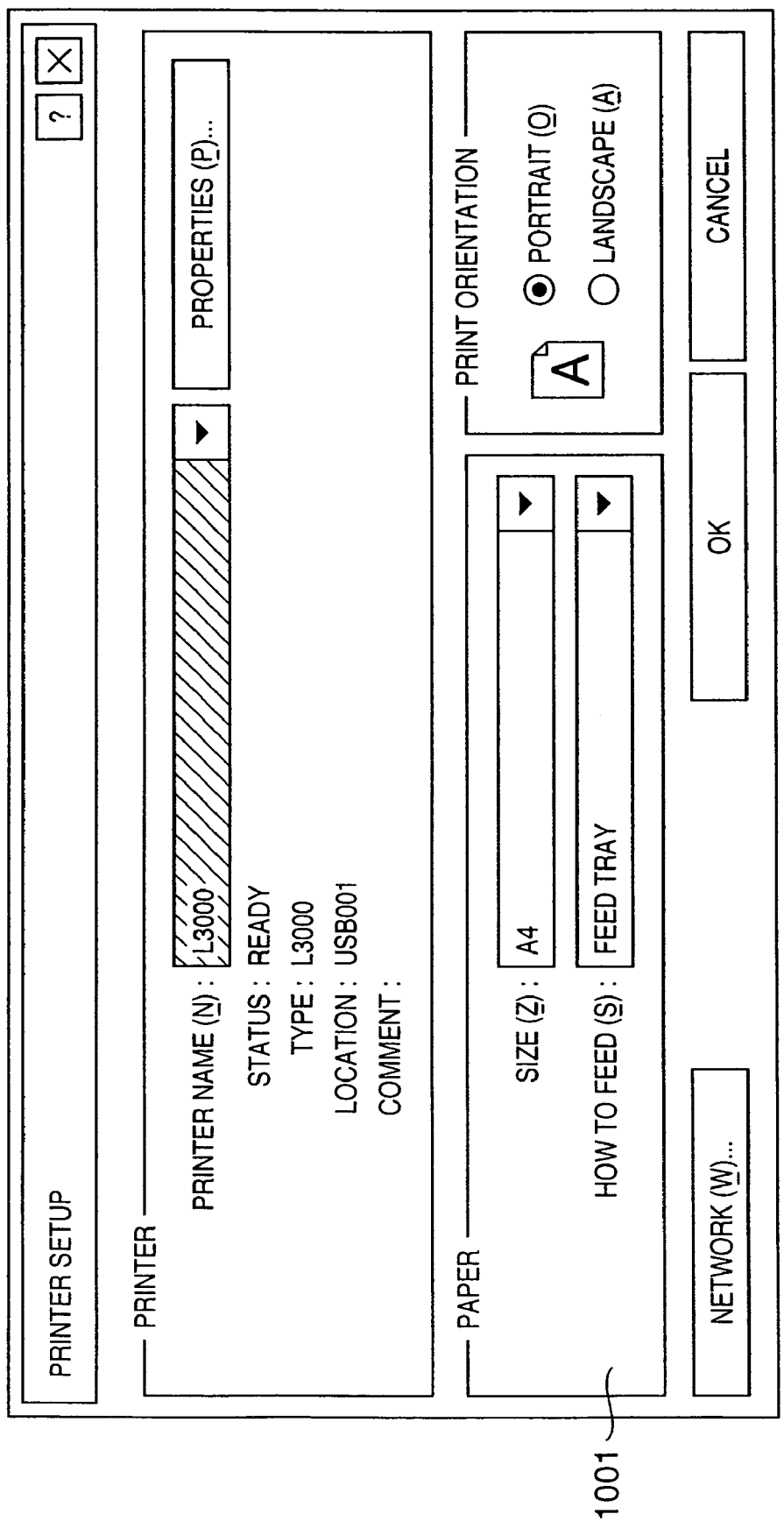
FIG. 10 is a view illustrating a feed method designation window.

As shown in FIGS. 8 and 10, the display/operation portion 110 allows designating a feed method desired by the user from a plurality of feed methods via "feed method" designation portions (801 and 1001). The display/operation portion 110 can display an actual feed method designation window on the display device, and perform a process associated with designation of a feed method which is input by the operator with the operation device such as a keyboard or pointing device. Even when "1-sheet manual feed" is designated as a feed method at the "feed method" designation portion (801 or 1001), the print processing portion 108 performs the same process as that for designation of the feed method designation portion 109.

Figure 2:
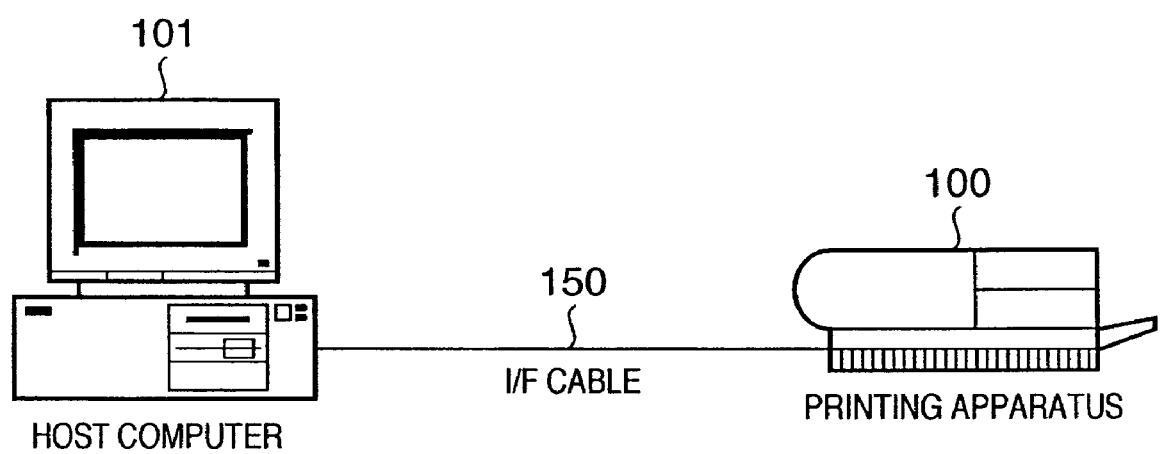
FIG. 2 is a view showing an example of the configuration of a printing system according to an embodiment of the present invention.
Figure 16:
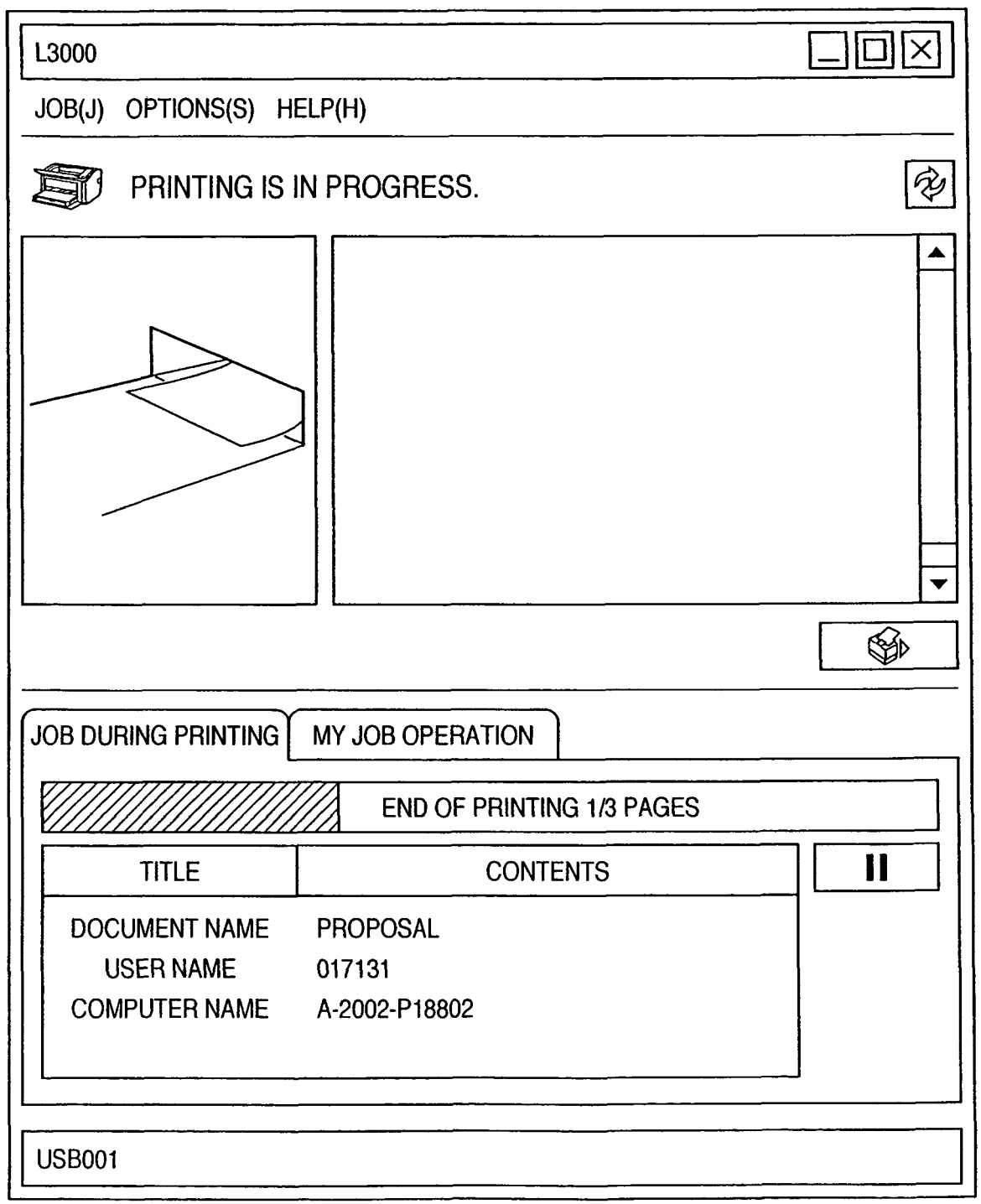
FIG. 16 is a view showing another example of displaying the state of the printing apparatus on the display device of the host computer.

FIG. 2 is a view showing an example of the configuration of a printing system according to the first embodiment of the present invention. More specifically, this printing system is configured by one-to-one-connecting the printing apparatus 100 and the host computer 101 (e.g., a personal computer or work station) via the bidirectional interface 150 (e.g., a serial interface, parallel interface, or USB interface). The printing system performs a print process by the host computer 101 and printing apparatus (host-based printer) 100 together. Data is transmitted/received via the bidirectional interface 150, and status information representing various states of the printing apparatus can be displayed on the display device of the host computer 101 in, e.g., display forms as shown in FIGS. 15 to 17.

Figure 3:
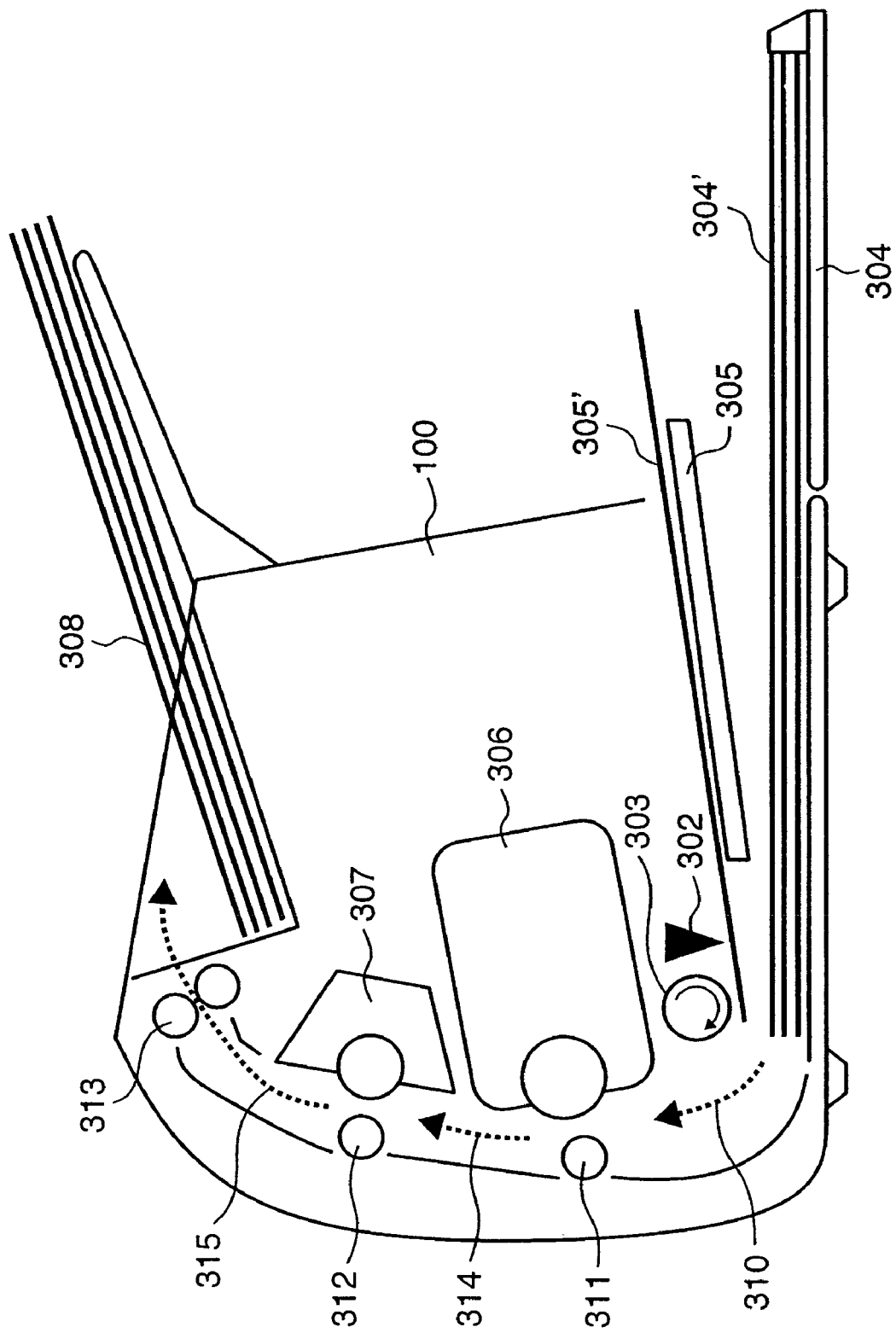
FIG. 3 is a view for illustratively explaining the configuration of a printing apparatus serving as a host-based printer according to the embodiment of the present invention.

The concrete configuration of the printing apparatus will be explained with reference to FIG. 3. FIG. 3 shows a laser beam printer as an example of the printing apparatus 100. However, the gist of the present invention is not limited to the laser beam printer, and can be applied to, e.g., an ink-jet printing apparatus as far as the printing apparatus can be connected as a host-based printer to the host computer 101 and the feed mechanism is shared between the feed cassette and the manual feed port.

In FIG. 3, reference numeral 301 denotes a printing apparatus main body; 304, a feed cassette (to be also referred to as a "cassette feed portion"); and 305, a 1-sheet manual feed port (to be simply referred to as a "manual feed portion" hereinafter).

Reference numeral 302 denotes a sensor which detects the presence/absence of a print sheet. The sensor 302 is common to a print sheet 304' loaded in the feed cassette 304, and a print sheet 305' inserted into the manual feed port 305. Because of the relationship between the position where the sensor 302 is arranged and the positions where the manual feed port and feed cassette are arranged, when print sheets exist in both the feed cassette and manual feed port, the print sheet 305' inserted into the manual feed port arranged above the feed cassette is detected preferentially to the print sheet 304' loaded in the feed cassette. When the print sheet 305' inserted into the manual feed port runs out but the print sheet 304' is loaded in the feed cassette, the sensor 302 detects the print sheet 304', and outputs a signal representing that the print sheet exists.

More specifically, if a print sheet exists in the feed cassette 304 or 1-sheet manual feed portion 305, the sensor 302 determines that a print sheet printable by the printing apparatus 100 exists (the sensor 302 does not distinctively detect the print sheet 304' loaded in the feed cassette 304 and the print sheet 305' inserted into the 1-sheet manual feed portion 305).

The first embodiment of the present invention adopts print control for solving a problem of, when the operator is to print on a postcard or envelope from the 1-sheet manual feed port, feeding the second and subsequent print sheets from the feed cassette, printing on print sheets not expected by the operator, and wastefully consuming print sheets, toner, or ink. Concrete contents will be explained with reference to the flowchart of FIG. 13, and a detailed description thereof will be omitted here.

Reference numeral 303 denotes a pickup roller which forms the convey mechanism 152 (see FIG. 1) and is common to the manual feed port 305 and feed cassette 304. Under the control of the print mechanism control portion 104, the pickup roller 303 is driven to rotate and guide a print sheet set at each feed portion (304 or 305) to a convey path indicated by an arrow 310 of a broken line.

Reference numeral 306 denotes a toner cartridge; 307, a fixing unit which heats and fixes a toner image formed on a print sheet; and 308 a delivery tray. Reference numeral 311 denotes a convey roller; 312, a press roller; and 313, delivery rollers. These rollers form the convey mechanism 152 shown in FIG. 1. Under the control of the print mechanism control portion 104, the convey roller 311 and the like are driven to convey a print sheet via convey paths 314 and 315 indicated by arrows of broken lines.

Figure 4:
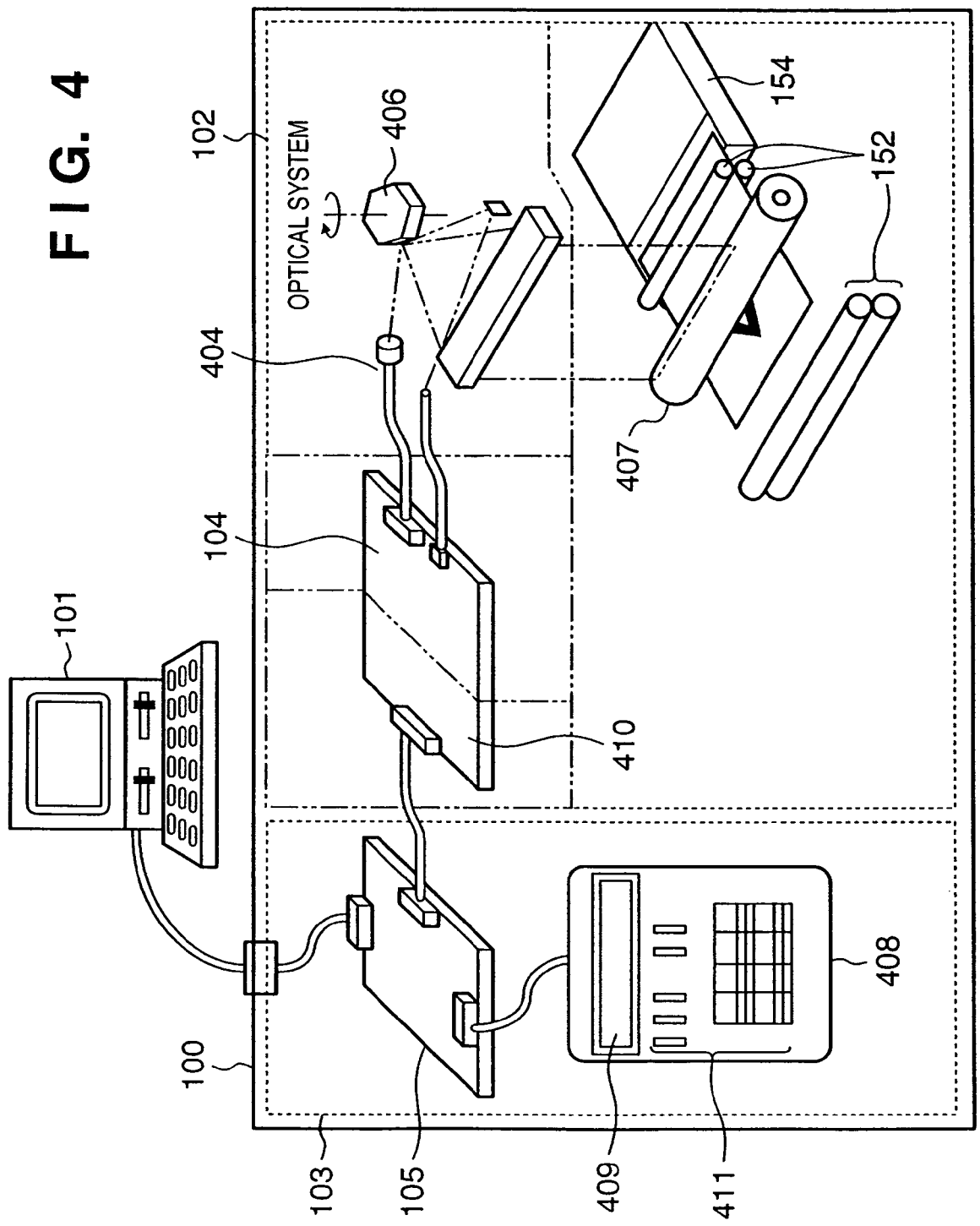
FIG. 4 is a view for illustratively explaining the configuration of a print mechanism portion in the printing apparatus.

FIG. 4 is a conceptual view showing an example of the printing apparatus 100 according to the present invention. As an example of the printing apparatus 100, a laser beam printer will be explained which uses a laser source as a light-emitting element, irradiates a photosensitive body with a laser beam to form an electrostatic latent image, and transfers a toner image onto a print sheet. The printing system is built by connecting the printing apparatus 100 to the host computer 101 which transmits printout data and the like to the printing apparatus 100.

The print control circuit 105 converts printout data transmitted from the host computer 101 into a video signal, and outputs the video signal to the print mechanism control portion 104. The print mechanism control portion 104 receives the video signal via a video interface portion 410, and controls the ON/OFF state of a laser unit 404, and rotation of the optical system (rotating mirror 406) and photosensitive body 407 in accordance with the video signal. The print mechanism control portion 104 can also receive a control command transmitted from the host computer 101 in addition to the video signal. The print mechanism control portion 104 can transmit, to the print control circuit 105, status information representing the operation states of the convey mechanism 152, feed mechanism 154, and the like.

In the laser beam printer, the laser unit 404, optical system (rotating mirror 406), and photosensitive body 407 form the print portion 151 in FIG. 1 as a mechanism which executes printing.

Reference numeral 408 denotes an operation panel in the printing apparatus 100. A display portion 409 can display, e.g., a message "insert a print sheet into the manual feed port 305". An operation input portion 411 can input an instruction from the operator, and can input, e.g., a message that a print sheet is inserted into the manual feed port 305.

Figure 5:
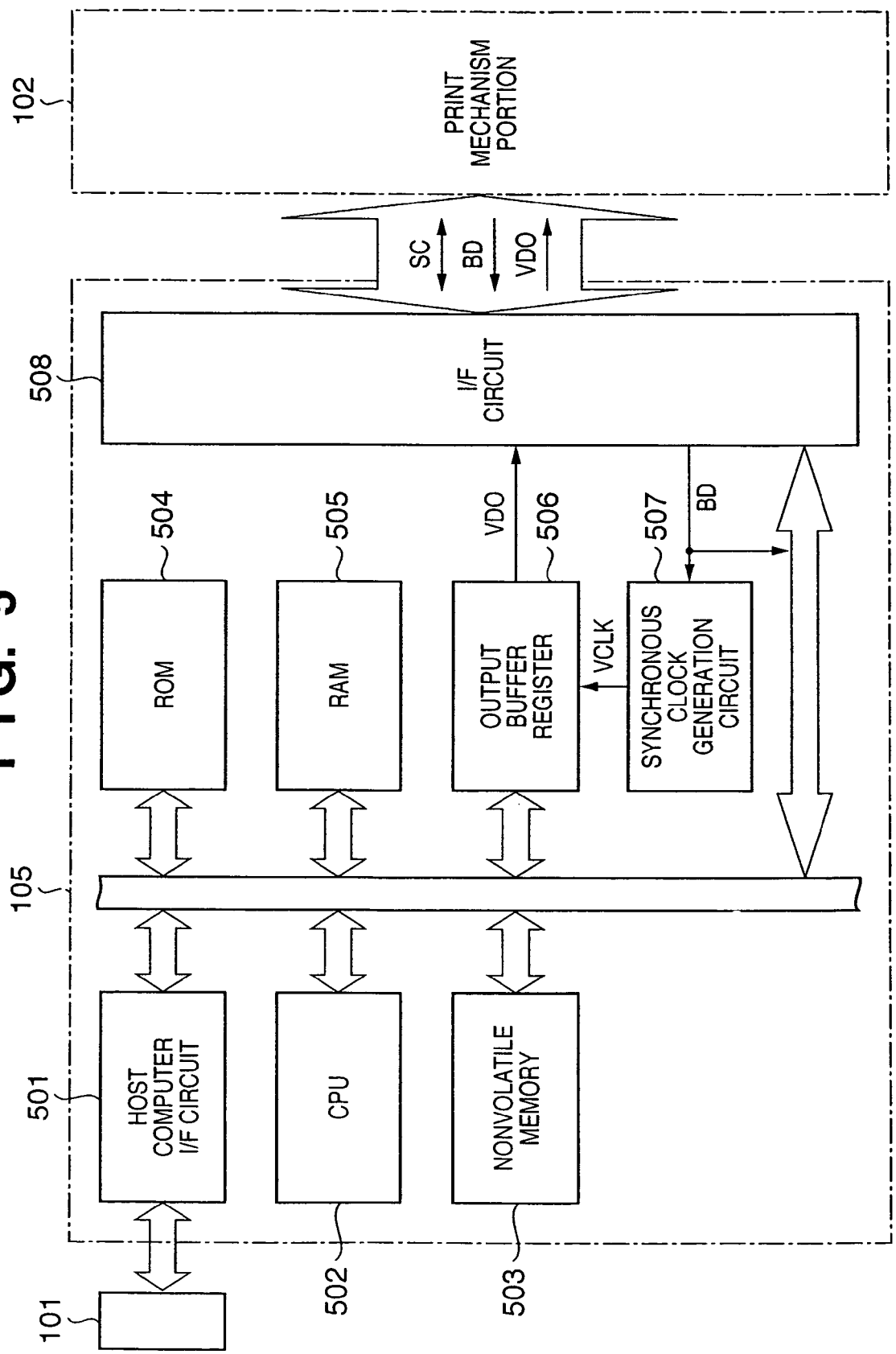
FIG. 5 is a block diagram for explaining the detailed configuration of a print control circuit shown in FIG. 4.

FIG. 5 is a block diagram for explaining the detailed configuration of the print control circuit 105 shown in FIG. 4. In FIG. 5, reference numeral 501 denotes a host computer interface (I/F) circuit functioning as an input/output portion for transmitting/receiving data to/from the host computer 101. Reference numeral 502 denotes a central processing unit (CPU) which performs the overall control of the print control portion 103. Reference numeral 503 denotes a nonvolatile memory for storing information which is not lost even if the printing apparatus 100 is turned on/off, and is formed from an EEPROM or the like. Reference numeral 504 denotes a memory (ROM) which stores a control program executed by the central processing unit (CPU) 502. Reference numeral 505 denotes a random access memory (RAM) for storing necessary information in executing the control program stored in the ROM 504.

A reception buffer for printout data transmitted from the host computer 101, an area where image data (bitmap data) is generated on the basis of printout data and stored, and the like are ensured in the RAM 505.

Reference numeral 506 denotes an output buffer register for converting image data stored in the RAM 505 into an image signal VDO. Reference numeral 507 denotes a synchronous clock generation circuit which generates an image clock signal VCLK synchronized with a binary digital signal (BD signal). Reference numeral 508 denotes an interface circuit which transmits/receives data to/from the print mechanism portion 102.

Figure 6:
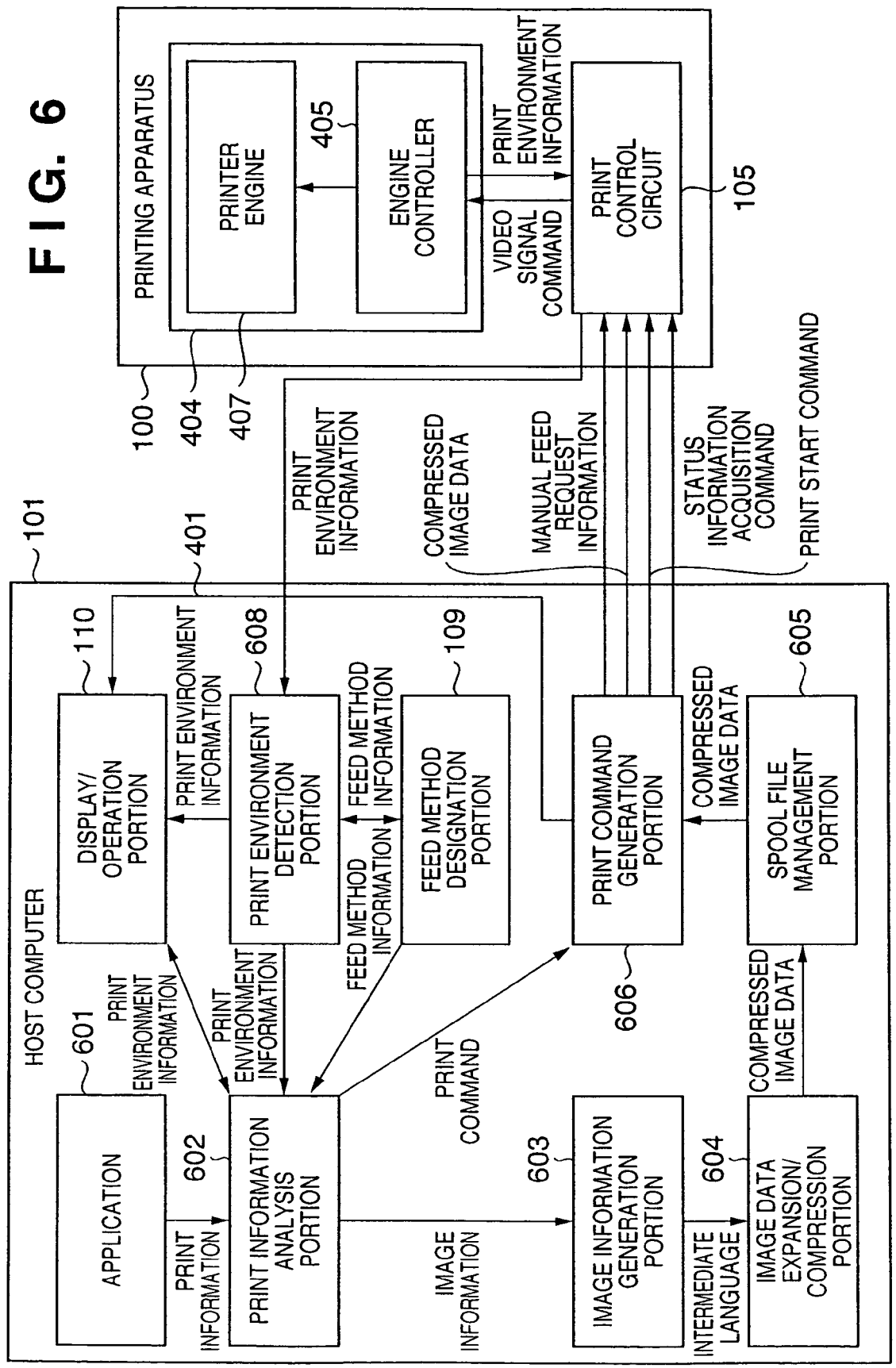
FIG. 6 is a block diagram for explaining the operation of a print information processing system.

The operation in the print information processing system will be explained with reference to the block diagram of FIG. 6. Simultaneously when the host computer 101 in FIG. 6 is activated, a print information analysis portion 602, print command generation portion 606, and print environment detection portion 608 in the host computer 101 are activated.

At this time, the display/operation portion 110 displays the status of the printing apparatus 100 as shown in FIG. 15 via the window of the host computer 101 so that the operator can set a print environment for the printing apparatus 100 (in the example of FIG. 15, "ready to print." (1501) is displayed to represent a print ready state).

The print command generation portion 606 periodically transmits, to the printing apparatus 100, a status information acquisition command representing the operation state of the printing apparatus. Upon reception of this command, the print control circuit 105 of the printing apparatus 100 transfers status information to the print environment detection portion 608 of the host computer 101. Then, the print environment detection portion 608 in the host computer 101 receives the status information transmitted from the printing apparatus 100, and notifies the display/operation portion 110 and print information analysis portion 602 of the status information transmitted from the printing apparatus 100.

On the basis of the status information transmitted from the printing apparatus 100, the display/operation portion 110 displays the state of the printing apparatus 100 (status of the printing apparatus) on the screen of the host computer 101 in the form (status window) as shown in FIG. 15.

Printout from the host computer 101 will be explained. If the operator designates printout during execution of any application program (to be also simply referred to as an "application" hereinafter), an application program 601 sends print information such as a drawing command or control command to the print information analysis portion 602. The print information analysis portion 602 analyzes the print information output from the application program 601, and outputs image information to an image information generation portion 603. The print information includes data (e.g., character code, figure, and image) for actually performing a print process, and a print drawing command to designate the print position, size, print orientation, and the like.

The image information generation portion 603 converts image data of each page into a unique intermediate language. When the image information generation portion 603 generates the intermediate language of one page (two pages in double-sided printing), it sends the intermediate language to an image data expansion/compression portion 604. The image data expansion/compression portion 604 expands print image data on the basis of the intermediate language, compresses the expanded image data, and sends the compressed image data to a spool file management portion 605.

In the following description, a case wherein 1-page printout data (compressed image data) is transferred to the printing apparatus 100 will be explained. However, the present invention is not limited to this. For example, when double-sided printing is performed in a situation in which the printing apparatus is equipped with a buffer for accumulating 2-page printout data, 2-page printout data may be transferred. Also, every time the printing apparatus 100 performs a 2in1 layout process (layout process of reducing and laying out two logical pages on one surface of paper) based on 2-page compressed image data, 2-page printout data is assumed to be transferred. That is, the present invention can be applied to a case wherein printout data of a page or pages to be printed on one physical paper sheet is transferred.

The spool file management portion 605 writes compressed image data sent from the image data expansion/compression portion 604 in a spool file. When 1-page compressed image data is written in the spool file, the spool file management portion 605 sequentially reads out the compressed image data, and sends them to the print command generation portion 606.

The print command generation portion 606 transfers the compressed image data read out from the spool file to the printing apparatus 100 via the bidirectional interface 150. When the operator designates a feed method as shown in FIG. 8 or 10, the feed method designation portion 109 holds information on the feed method (to be referred to as "feed method information" hereinafter). When the operator executes printout of any document, the feed method designation portion 109 notifies the print information analysis portion 602 of the held feed method information. The print information analysis portion 602 sets the feed method information in feed port designation information 1202 of FIG. 12 (to be described later).

Figure 12:
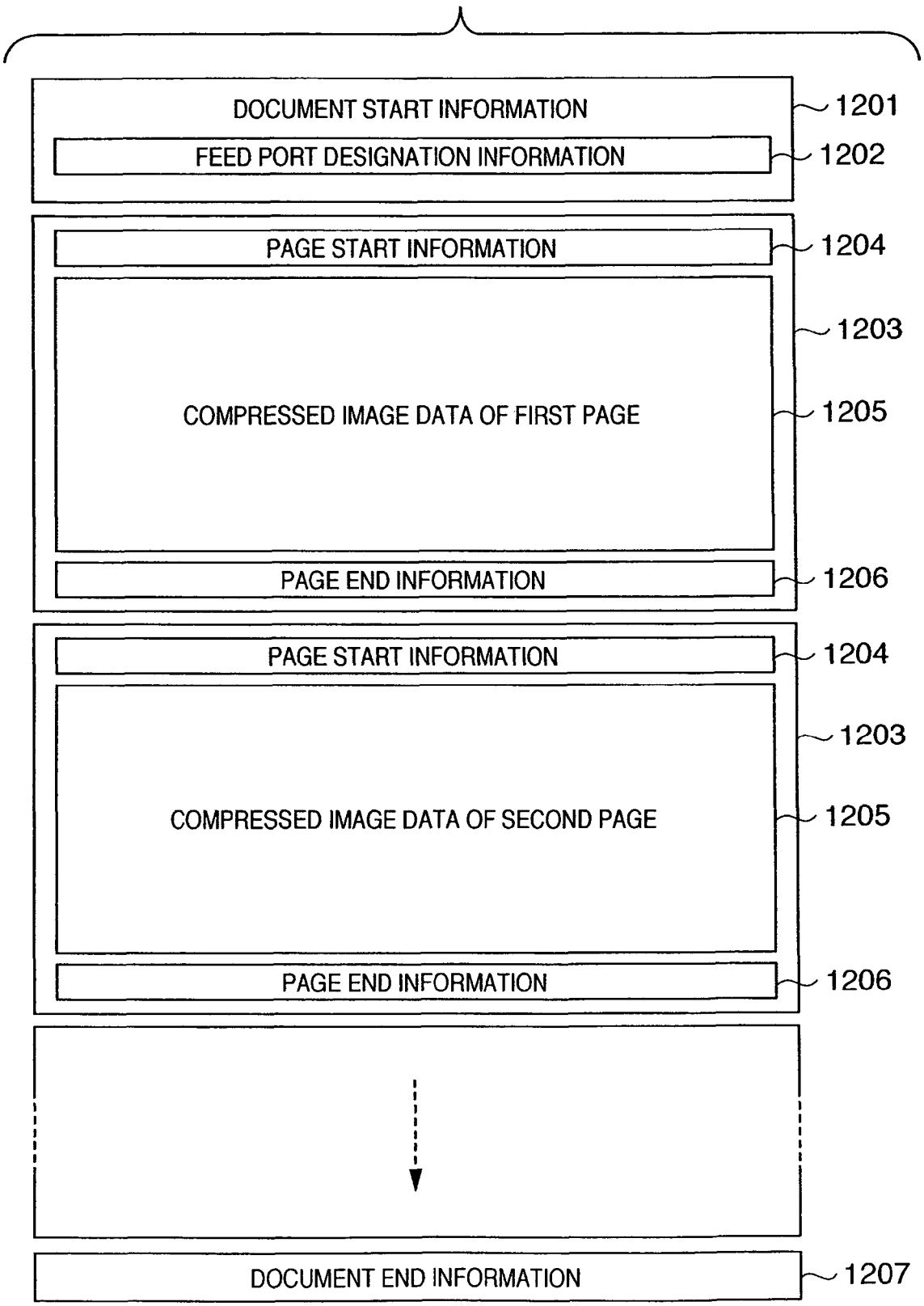
FIG. 12 is a view schematically showing the file structure of a spool file according to the first embodiment.

The feed port designation information 1202 in FIG. 12 is referred to when the print command generation portion 606 transmits printout data (compressed image data) of each page to the printing apparatus 100. When manual feed designation is set in the feed port designation information 1202, the print command generation portion 606 notifies the display/operation portion 110 that manual feed designation is set in the feed port designation information 1202 in a spool file 702. Upon reception of this notification, the display/operation portion 110 displays, on the display screen of the host computer 101, a display to prompt the operator to set a print sheet at the manual feed port 305 for each page. When a manual feed port is set in the feed designation information 1202, the print command generation portion 606 outputs, to the print control circuit 105, a display request (manual feed request information) to prompt the user to set a print sheet at the manual feed port 305. Upon reception of the request (manual feed request information) to set a print sheet at the manual feed port, the print control circuit 105 flickers, e.g., the LED (see the Paper LED 903 in FIG. 9) on the operation panel of the printing apparatus 100, and prompts the operator to set a print sheet at the manual feed port.

The print information analysis portion 602, image information generation portion 603, image data expansion/compression portion 604, spool file management portion 605, and print command generation portion 606 in FIG. 6 correspond to the print processing portion 108 in FIG. 1.

The process of the printing apparatus 100 shown in FIG. 6 will be explained. When the print control circuit 105 receives manual feed request information from the print command generation portion 606, it flickers the LED (see the Paper LED 903 in FIG. 9) on the operation panel, and prompts the operator to set a print sheet. In addition, the print control circuit 105 makes the operation of the printing apparatus 100 stand by until the user sets a print sheet at the manual feed port 305 and a print instruction is issued. Since the operation of the printing apparatus 100 stands by, it can be prevented to erroneously convey a print sheet loaded in the feed cassette 304 and continue a print process when the manual feed port 305 is originally designated.

Figure 9:
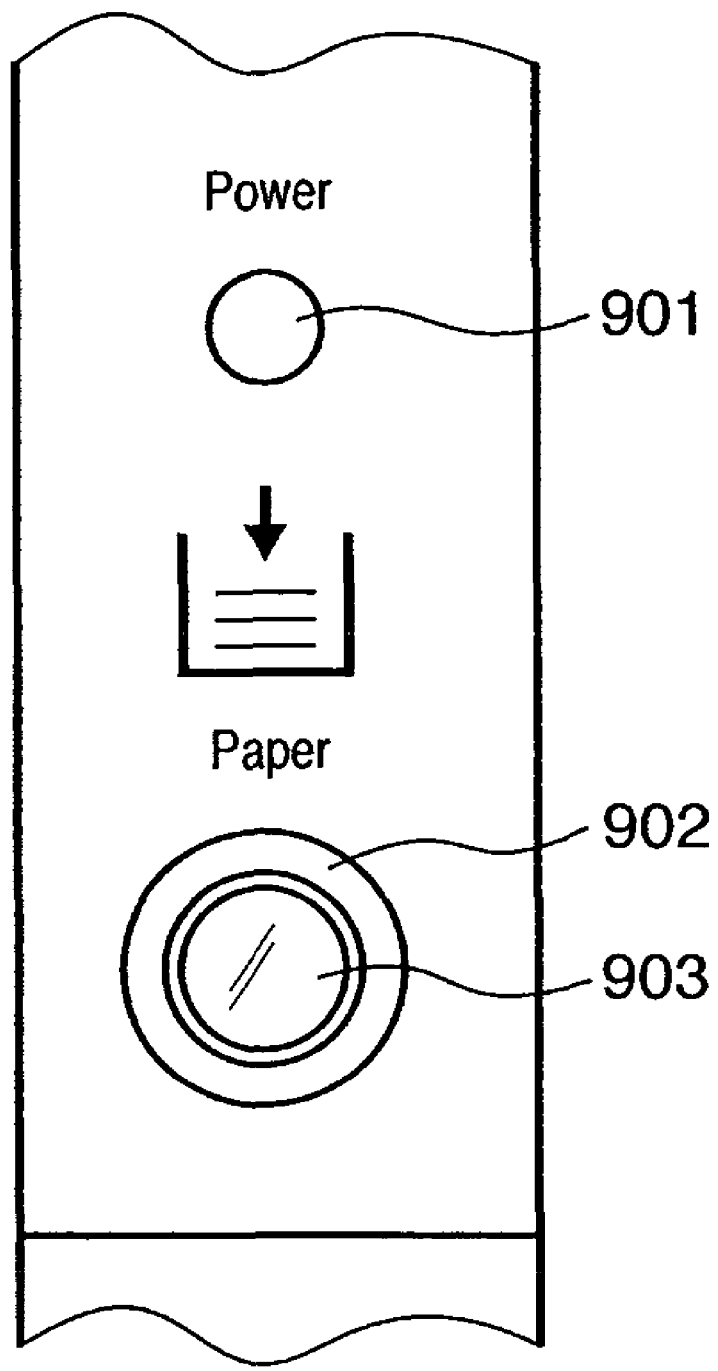
FIG. 9 is a view showing an example of an operation panel.

When the operator sets a predetermined print sheet at the manual feed port 305 and completes preparations of feed from the manual feed port 305, he presses a Paper key 902 shown in FIG. 9 and designates continuation of printing on the print sheet from the manual feed port. Then, the print control circuit 105 cancels the standby state, and information based on the instruction input by pressing the Paper key 902 is transmitted as print environment information (information representing permission to transfer compressed image data) from the print control circuit 105 to the host computer 101. The print command generation portion 606 is notified of the print environment information via the print environment detection portion 608 and print information analysis portion 602. The print command generation portion 606 identifies the permission to transfer compressed image data serving as print data, and can output a print start command, printout data, and the like to the print control circuit 105. Note that information based on an instruction input by pressing the Paper key 902 will be explained in detail below.

Upon reception of the print environment information (notification representing that a print sheet is prepared at the manual feed port 305 upon press of the Paper key 902) from the print environment detection portion 608, the display/operation portion 110 cancels the window display which prompts the operator to set a print sheet at the manual feed port 305. This cancellation can correspond to, e.g., erase of the window display.

After 1-page printout data (compressed image data) is written in the spool file 702, the host computer 101 transmits a print start command to the print control circuit 105 of the printing apparatus 100 via the print command generation portion 606. The print start command sent from the host computer 101 is transferred to an engine controller 405 via the print control circuit (printer controller) 105 in FIG. 1.

The compressed image data sent from the host computer 101 via the print command generation portion 606 is transferred to an image memory (corresponding to the RAM 505 in FIG. 5) in the print control circuit 105 and decompressed into original image data. The image data is converted into a video signal, which is sent to a printer engine 407 for actually performing a print process. The engine controller 405 and printer engine 407 correspond to the print mechanism portion 102 in FIG. 1.

Various types of error information in the print mechanism portion 102 are transferred to the host computer 101 via the print control circuit (printer controller) 105. The error information is transmitted as status information of the printing apparatus 100 to the print environment detection portion 608 in the host computer 101, notifying the display/operation portion 110 of the status information.

Figure 7:
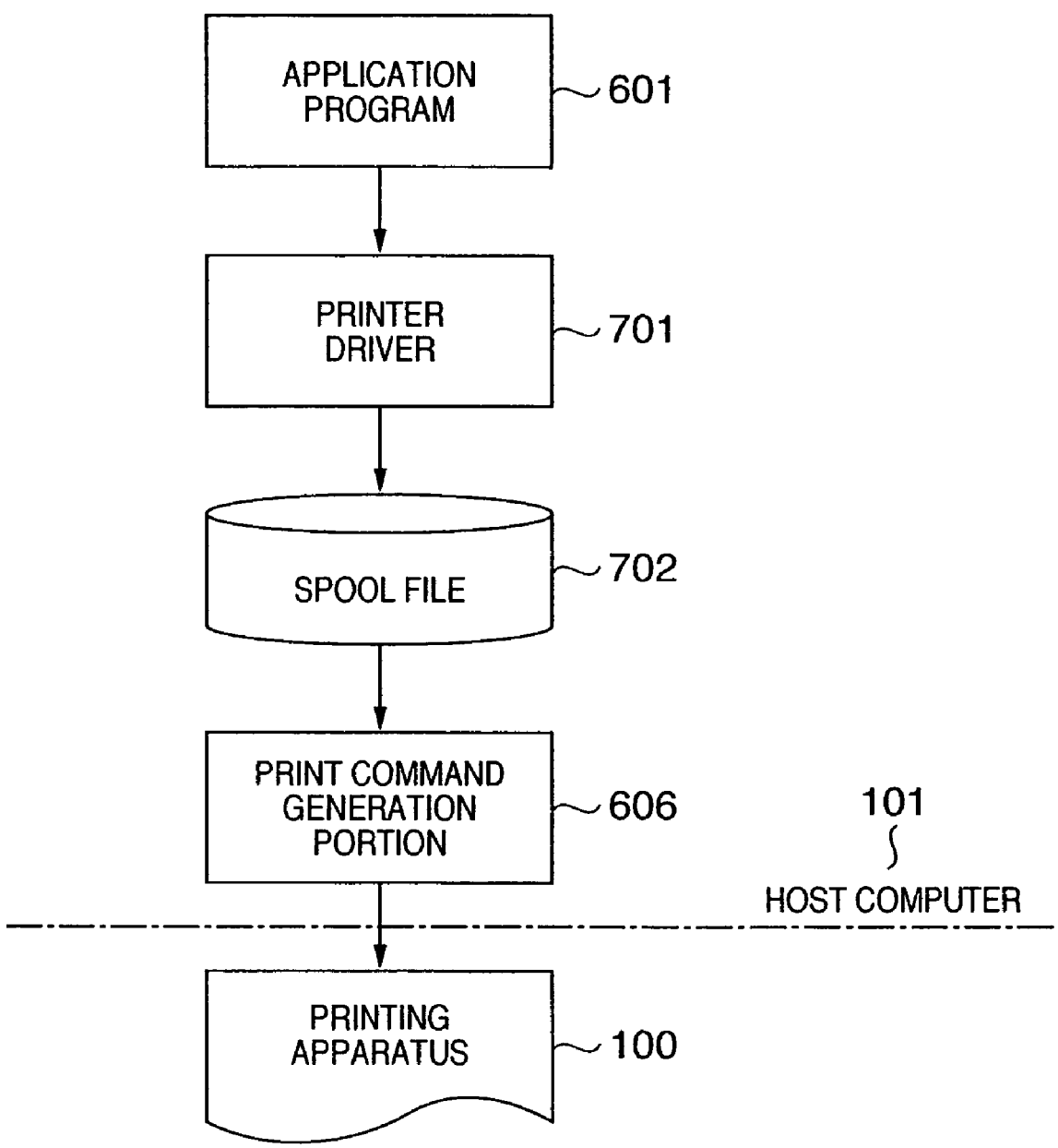
FIG. 7 is a chart showing the flow of a process in a host computer 101.

FIG. 7 is a chart showing the flow of a process in the host computer 101. When the operator executes printout of any document from the application program 601, a printer driver 701 generates compressed image data of each page in accordance with various print commands from the application program 601, and stores the compressed image data in the spool file 702. The printer driver 701 corresponds to the functions of the print information analysis portion 602, image information generation portion 603, and image data expansion/compression portion 604 shown in FIG. 6.

One spool file 702 is stored for one document in a secondary storage device such as a hard disk, and each file has a format as shown in FIG. 12. In FIG. 12, reference numeral 1201 denotes document start information which stores information of the entire document and in which information on the entire document is set. The feed port designation information 1202 designates which feed port feeds a print sheet in printing. Reference numeral 1203 denotes information of each page; 1204, page start information; 1205, compressed image data of each page; 1206, page end information of each page; and 1207, end information of the entire document.

The spool file 702 is managed by the spool file management portion 605 in FIG. 6. The print command generation portion 606 transfers compressed image data of each page read out from the spool file 702 to the printing apparatus 100 via the interface cable 150.

FIG. 9 is a view for explaining the detailed configuration of the operation panel 408 shown in FIG. 4. In FIG. 9, reference numeral 901 denotes a power LED which lights when the printing apparatus 100 is turned on. The operation key (Paper key) 902 is used to designate continuation of printing in manual feed. The Paper LED 903 prompts the operator to set a paper sheet at the manual feed port in manual feed.

The flow of print control in the printing apparatus and host computer 101 will be explained with reference to the flowchart of FIG. 13. When the operator executes any printing from the host computer 101, compressed image data of a document to be printed is stored in the spool file 702. After the compressed image data is stored in the spool file 702, the process of the flowchart in FIG. 13 starts in the host computer 101.

Figure 13:
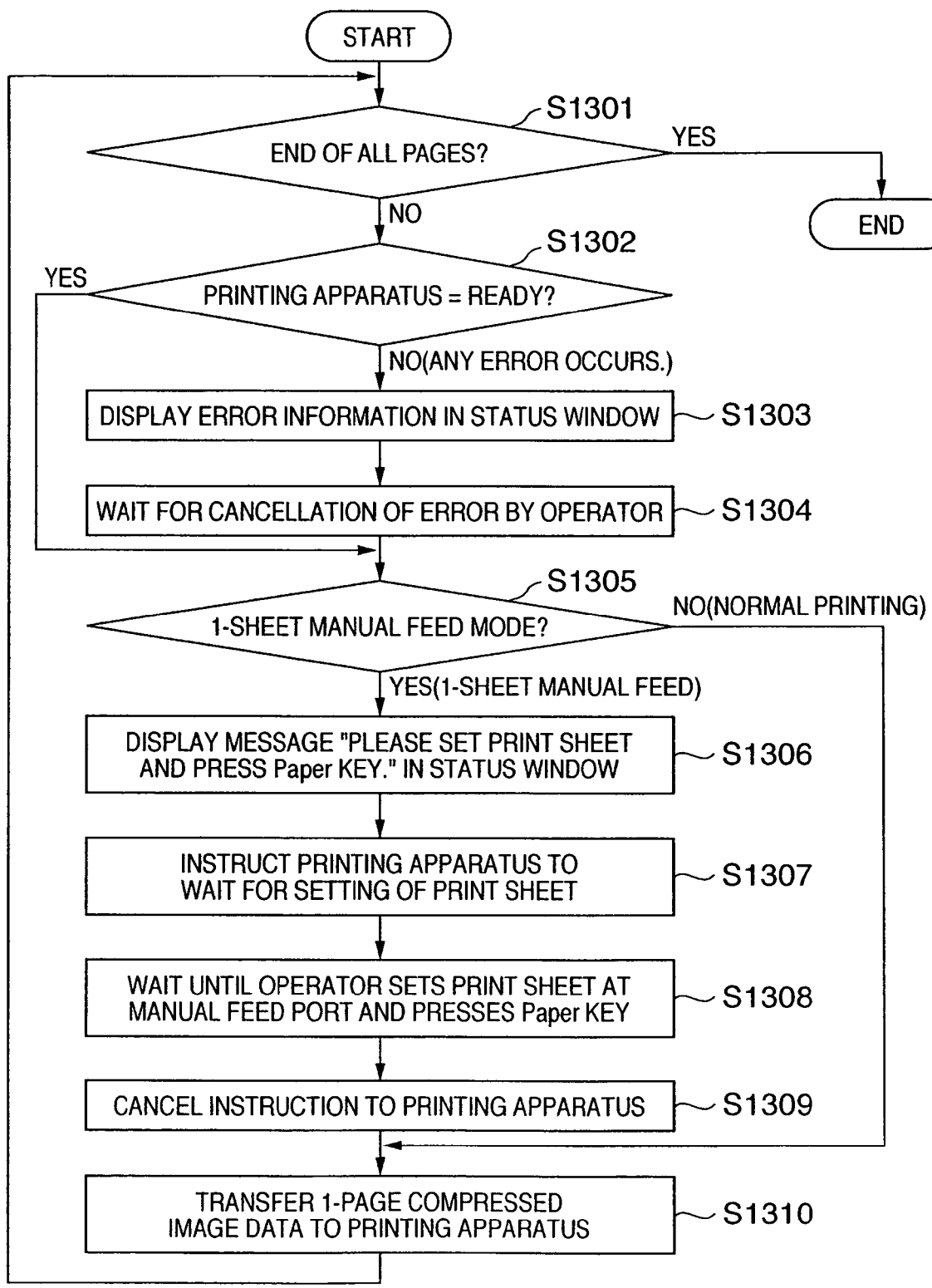
FIG. 13 is a flowchart for explaining the flow of print control in the printing apparatus and host computer according to the first embodiment.

The print information analysis portion 602 checks whether all the pages of the document which is designated by the operator to be printed out have been printed out (S1301 in FIG. 13). If all the pages have been printed out, the process ends.

If an unprinted page exists in step S1301 (NO in S1301), the process advances to step S1302 to determine whether the printing apparatus can print (is ready) (S1302). If it is determined in step S1302 that the printing apparatus can print (YES in S1302), the process advances to step S1305.

If it is determined by the print information analysis portion 602 in step S1302 on the basis of print environment information received by the print environment detection portion 608 from the printing apparatus 100 that any error occurs in the printing apparatus 100 (NO in S1302), the process advances to step S1303. In step S1303, the display/operation portion 110 displays error information of the printing apparatus 100 in, e.g., a status window representing the operation of the printing apparatus as shown in FIG. 17 on the display device of the host computer 101 (S1303). In step S1304, the process waits until the operator cancels the error.

If the operator cancels the error and the printing apparatus 100 returns to the print ready state in step S1304, the process advances to step S1305, and the print command generation portion 606 refers to feed port designation information (1202 in FIG. 12) in the spool file 702, and determines whether the feed method designated by the operator is 1-sheet manual feed designation (S1305). If it is determined in step S1305 that a normal feed cassette is designated (NO in S1305), the process advances to step S1310 to transfer 1-page compressed image data to the printing apparatus 100, and then returns to step S1301. If it is determined in step S1301 that all pages have been processed (YES in S1301), the process ends; if it is determined in step S1301 that not all pages have been processed (NO in S1301), the process from step S1302 is similarly executed.

If it is determined in step S1305 that the 1-sheet manual feed port 305 is designated (YES in S1305), the print command generation portion 606 notifies the display/operation portion 110 that manual feed designation is set in the feed port designation information 1202 of the spool file 702. Upon reception of this notification, the display/operation portion 110 displays, on the display screen of the host computer 101, a display to prompt the operator to set a print sheet at the manual feed port 305 for each page. In this case, the display/operation portion 110 displays, on the screen of the host computer 101, a message "please set a print sheet at the manual feed port and press [Paper] key.", as shown in FIG. 11, in order to prompt the user to set a print sheet at the manual feed port (S1306).

The process advances to step S1307, and the print command generation portion 606 outputs, to the print control circuit 105, a display request (manual feed request information) to prompt the user to set a print sheet at the manual feed port 305. Then, the Paper LED 903 which prompts the user to set a print sheet at the manual feed port 305 flickers.

In step S1308, the print control circuit 105 makes the print operation in the printing apparatus 100 stand by until the operator sets a print sheet at the manual feed port 305 and presses the Paper key 902 (FIG. 9) (S1308). By pressing the Paper key 902 (FIG. 9), the cost of a sensor which accurately detects whether a print sheet is set at the manual feed port 305 can be reduced.

In step S1309, if the Paper key 902 is pressed, the print control circuit 105 cancels the standby state of the printing apparatus 100. An instruction input by pressing the Paper key 902 is transmitted as print environment information from the print control circuit 105 to the host computer 101. Upon reception of the print environment information from the print environment detection portion 608, the display/operation portion 110 cancels the window display which prompts the operator to set a print sheet at the manual feed port 305, and turns off the Paper LED 903 in the printing apparatus 100.

Several concrete examples of a method of identifying press of the Paper key 902 on the printer operation panel by the host computer 101 will be explained.

(Identification Method 1)

The host computer 101 inquires the state of the Paper key 902 of the print control circuit 105 of the printer in a predetermined cycle. In response to the inquiry, the print control circuit 105 sends back the state of the Paper key (e.g., whether the Paper key 902 is or is not pressed), the print ready state, or the like.

The host computer 101 monitors the state of the Paper key in the predetermined cycle, and can recognize that the Paper key 902 is pressed.

(Identification Method 2)

When the Paper key 902 is pressed, the printing apparatus 100 positively inquires the state. In response to the inquiry, the print control circuit 105 sends back the state of the Paper key (e.g., whether the Paper key 902 is or is not pressed), the print ready state, or the like. The host computer 101 receives the response, identifies it, and can recognize that the Paper key 902 is pressed.

(Identification Method 3)

This identification method becomes effective when the host computer 101 and printing apparatus 100 are connected by, e.g., a Centronics interface. More specifically, the host computer 101 is notified of the press of the Paper key on the printer operation panel by using an interrupt signal line extending from the printing apparatus 100 to the host computer 101 among signal lines of an interface cable which connects the host computer 101 and printing apparatus 100.

More specifically, when the print control circuit 105 recognizes press of the Paper key 902, it generates an interrupt event to the host computer 101 by using the interrupt signal line. The host computer 101 can recognize press of the Paper key 902.

(Identification Method 4)

This method is an application of the identification method 2. When there are many interrupt factors from the print control circuit 105 to the host computer 101, the number of interrupt signal lines is smaller than that of interrupt factors, and any interrupt factor occurs, the print control circuit 105 notifies the host computer 101 via a typical interrupt signal line that any interrupt factor occurs. Upon reception of the interrupt via the typical interrupt signal line, the host computer 101 inquires the interrupt factor of the print control circuit 105. If press of the Paper key is sent back as a response to the inquiry, the host computer 101 can recognize the press of the Paper key.

In step S1310, the print environment information is identified by the print environment detection portion 608 as information which is received by the host computer 101 in step S1309 and represents permission to transfer compressed image data (print data). The print command generation portion 606 is notified of the print environment information via the print information analysis portion 602. Then, the print command generation portion 606 can output a print start command, printout data, and the like to the print control circuit 105. In this step, the host computer 101 transfers 1-page compressed image data to the printing apparatus.

If transfer of the 1-page compressed image data ends, the process returns to step S1301. If all pages have been printed out, the process ends; if not all pages have been printed out, the process from step S1302 is repeated. When the 1-sheet manual feed mode is designated as the feed method, it is determined again whether the printing apparatus is ready (S1302). If it is determined that the printing apparatus is ready, the above-described message "please set a print sheet at the manual feed port and press [Paper] key." is displayed again on the screen of the host computer 101 (S1306), and the process from step S1307 is repeated.

Figure 14:
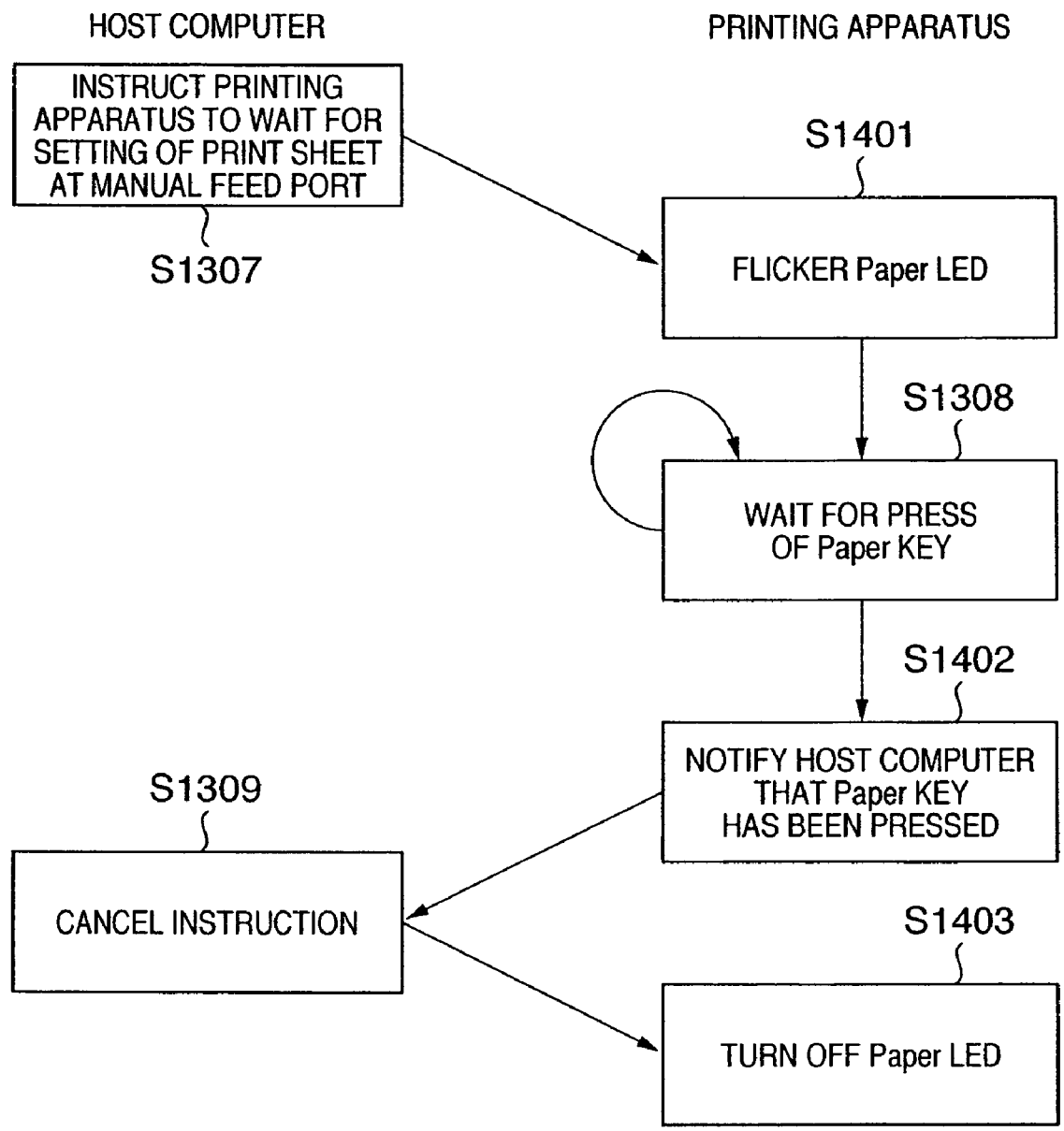
FIG. 14 is a view for explaining the relationship between the processes of the host computer 101 and a printing apparatus 100 that correspond to steps S1307 to S1309 in FIG. 13.

The relationship between the processes of the host computer 101 and printing apparatus 100 that correspond to steps S1307 to S1309 in FIG. 13 will be explained with reference to FIG. 14.

In step S1307, the print command generation portion 606 in the host computer 101 outputs, to the print control circuit 105, a display request (manual feed request information) to prompt the user to set a print sheet at the manual feed port 305.

Upon reception of the request, the printing apparatus 100 flickers the Paper LED 903 in step S1401.

In step S1308, the printing apparatus 100 stands by until the Paper key 902 is pressed.

In step S1402, if the Paper key 902 is pressed, the host computer 101 is notified of this input, and the display/operation portion 110 in the host computer 101 cancels, on the basis of the input in response to press of the Paper key 902, the window display which prompts the operator to set a print sheet at the manual feed port 305. The display/operation portion 110 turns off the Paper LED 903 of the printing apparatus 100 (S1403), and a series of processes ends.

The host computer (information processing apparatus) 101 which controls the printing apparatus 100 (host-based printer) capable of printing for each page on a print sheet loaded in a feed unit (feed cassette 304 (including a feed tray (MPT)) or a print sheet inserted from the manual feed port 305 comprises a determination portion (print command generation portion 606) which determines designation of feed from the feed unit or the manual feed port on the basis of the feed port designation information 1202, a display control portion (display/operation portion 110) which, when the determination portion determines that feed from the manual feed port 305 is designated, causes the display portion to display a display to prompt the operator to insert a print medium into the manual feed port, an identification portion (print environment detection portion 608) which identifies permission to transfer compressed image data, and a transfer portion (print command generation portion 606) which transfers compressed image data of one corresponding page to the host-based printer on the basis of the identification by the identification portion.

According to the first embodiment, the printing apparatus 100 (host-based printer) need not interpret an offline job command which is transmitted from the host computer 101 and controls printing for each page. The printing apparatus 100 controls the transfer start timing when the host computer 101 transfers, to the printing apparatus, compressed image data of a target page and a display to prompt the operator to set a print sheet at the manual feed port. With the configuration of a low-end printing apparatus, printing can be reliably performed by feeding a print sheet from the manual feed port as desired by the operator.

Second Embodiment

The first embodiment has described an example in which pages which form a document are printed on print sheets supplied from the manual feed port 305 one by one. The second embodiment will describe an example in which, when a series of documents (one file stored in a spool file 702) are to be printed, the operation of the printing apparatus is suspended at a page arbitrarily set by the operator, feed from a feed cassette 304 is switched to feed from a manual feed port 305, and the process is executed. The configurations of a host computer 101 and printing apparatus in the second embodiment are the same as those in the first embodiment, and a detailed description thereof will be omitted. The contents of the second embodiment will be described with reference to the accompanying drawings described in the first embodiment.

Figure 18:
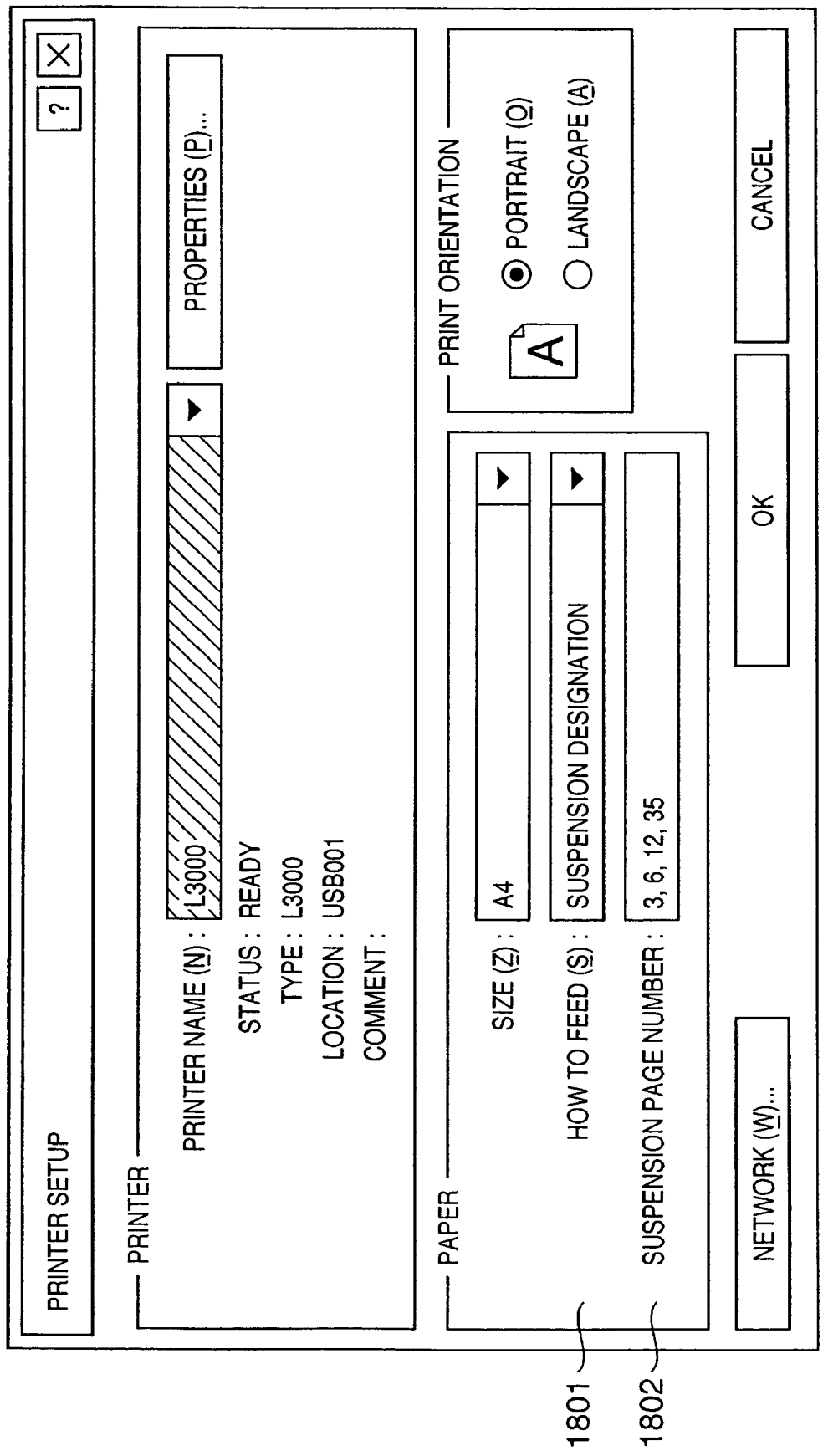
FIG. 18 is a view illustrating a window for designating a page at which the operation of the printing apparatus is suspended.

FIG. 18 is a view illustrating a window for designating a page at which the operation of the printing apparatus is suspended (this designation will be referred to as "suspension designation" hereinafter). This display is presented on the display screen by a display/operation portion 110 in the host computer 101.

In FIG. 18, "suspension designation" is input in an input column 1801, and suspension page numbers "3, 6, 12, 35" are input in an input column 1802. The operator inputs an arbitrary page number to the input column 1802. When a series of documents are printed, the operator suspends the operation of the printing apparatus at the page arbitrarily set by the operator. For example, feed from the feed cassette 304 is switched to that from the manual feed port 305, and printing can continue.

Figure 19:
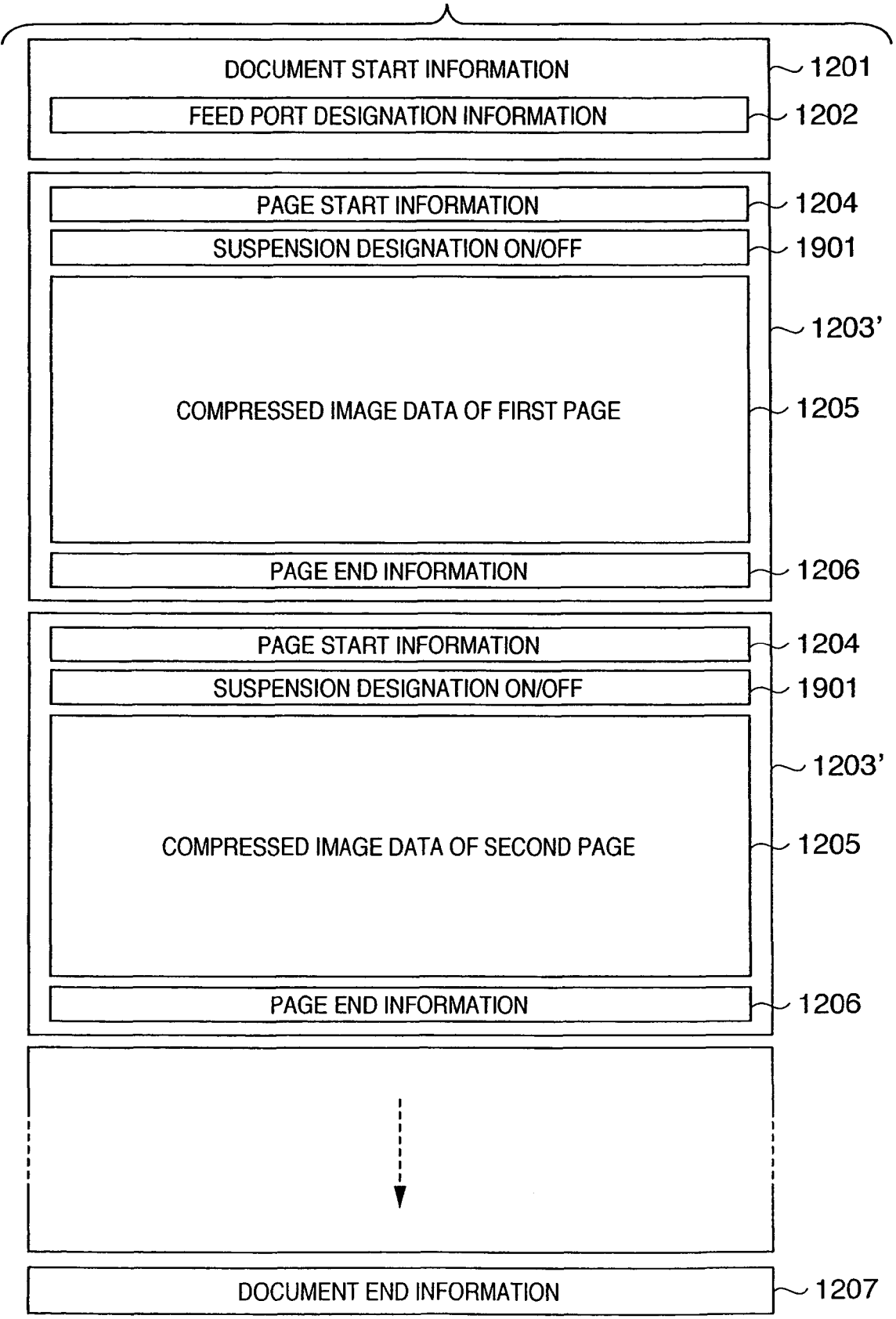
FIG. 19 is a view schematically showing the file structure of a spool file according to the second embodiment.

On the basis of the setting (suspension designation setting) in the input column 1801 of FIG. 18, a print information analysis portion 602 (see FIG. 6) adds suspension designation ON/OFF information to information 1203' of each page, as shown in 1901 of FIG. 19. The print information analysis portion 602 sets "ON" in suspension designation ON/OFF information of a page designated by the setting in the input column 1802, and sets "OFF" for an undesignated page.

FIG. 19 is a view showing the format of a spool file according to the second embodiment. Similar to FIG. 12 described in the first embodiment, document start information 1201 contains feed port designation information 1202. The information 1203' of each page contains page start information 1204, compressed image data 1205 of each page, page end information 1206, and the above-mentioned suspension designation ON/OFF information 1901. The end of the spool file contains document end information 1207 representing the end of the document.

One spool file is stored for one document in a secondary storage device such as a hard disk. In executing printing, the spool file is referred to by a print command generation portion 606 (see FIG. 6) or the like in the host computer 101.

Figure 20:
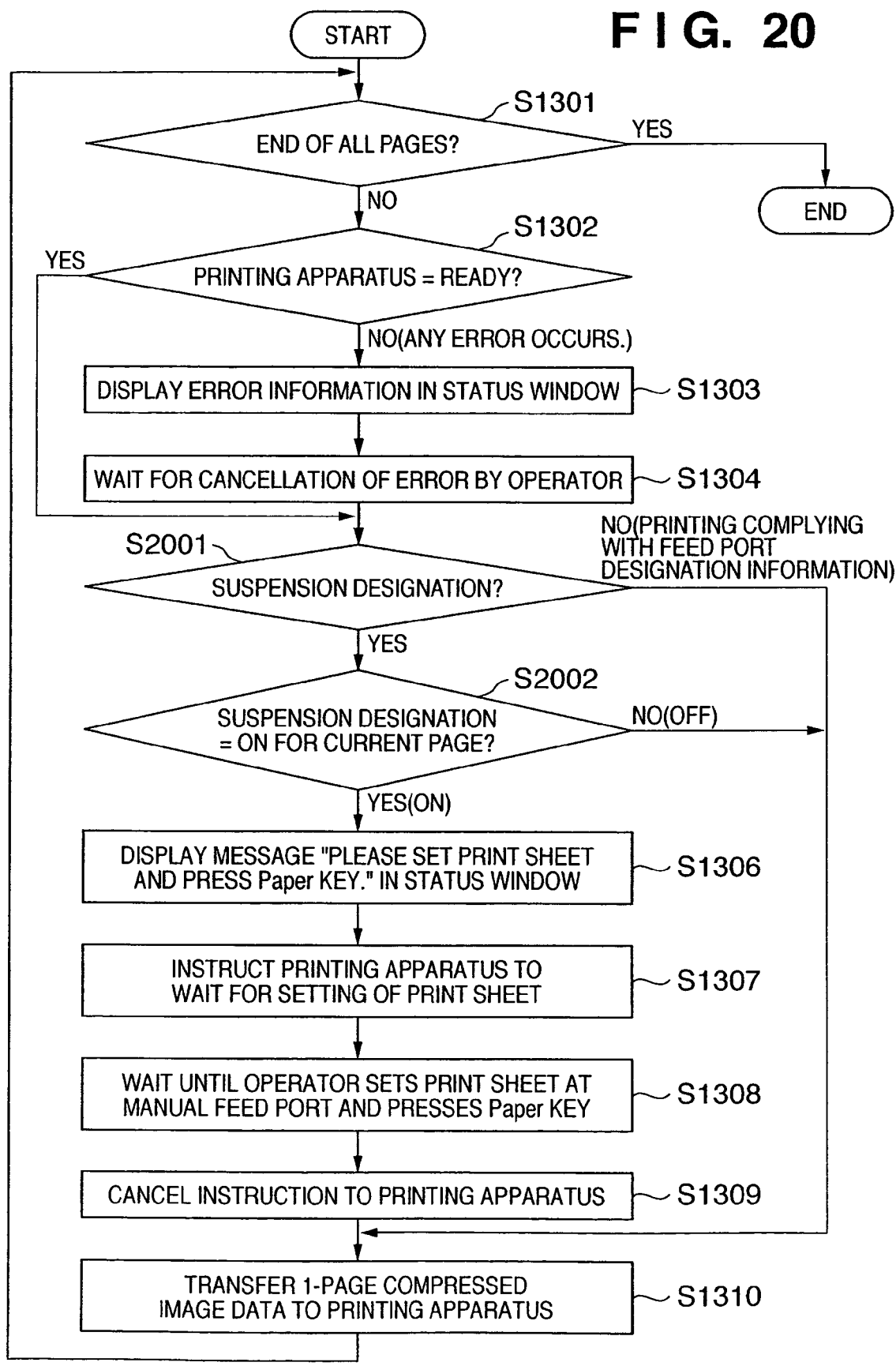
FIG. 20 is a flowchart for explaining the flow of print control in the printing apparatus and host computer according to the second embodiment.

FIG. 20 is a flowchart for explaining the flow of print control executed between the host computer 101 and a printing apparatus 100 according to the second embodiment. The same step numbers denote processes common to those in the flowchart of FIG. 13 according to the first embodiment.

When the operator executes any printing from the host computer 101, compressed image data of a document to be printed is stored in the spool file 702. After the compressed image data is stored in the spool file 702, the process of the flowchart in FIG. 20 starts in the host computer 101.

The print information analysis portion 602 checks in step S1301 whether all the pages of the document have been printed out. If all the pages have been printed out, the process ends; if an unprinted page exists (NO in S1301), the process advances to step S1302 to determine whether the printing apparatus can print (is ready) (S1302). If it is determined in step S1302 that the printing apparatus can print (YES in S1302), the process advances to step S2001.

If it is determined in step S1302 by the print information analysis portion 602 on the basis of print environment information received by a print environment detection portion 608 from the printing apparatus 100 that any error occurs in the printing apparatus 100 (NO in S1302), the process advances to step S1303. The display/operation portion 110 displays error information of the printing apparatus 100 in, e.g., a status window representing the operation of the printing apparatus as shown in FIG. 17 on the display device of the host computer 101 (S1303). In step S1304, the process waits until the operator cancels the error.

If the operator cancels the error and the printing apparatus 100 returns to the print ready state in step S1304, the process advances to step S2001, and the print command generation portion 606 refers to the presence/absence of suspension designation ON/OFF information (1901 in FIG. 19) in the spool file 702, and determines whether suspension designation is set in printing of the current page. If no suspension designation ON/OFF information 1901 is set in the information 1203' of the current page (NO in S2001), a process of printing a series of document files is executed in accordance with the setting of the feed port designation information 1202 contained in the document start information 1201. This process is the same as that described in the first embodiment.

In step S2001, the print command generation portion 606 determines whether designation information (suspension designation ON/OFF information 1901) for controlling the operation of the host-based printer for each page is contained in information (e.g., 1203' in FIG. 19) containing compressed image data of each page.

If the suspension designation ON/OFF information 1901 is set in the information 1203' of the current page (YES in S2001), the process advances to step S2002. If the print command generation portion 606 determines in step S2001 that the suspension designation ON/OFF information 1901 is contained, it determines whether a setting of suspending the operation of the printing apparatus 100 (host-based printer) is set in the designation information, i.e., the suspension designation ON/OFF information 1901 is set "ON" or "OFF". If the suspension designation ON/OFF information 1901 is "OFF", printing is executed in accordance with the setting of the feed port designation information 1202, similar to the case for NO of step S2001.

If the print command generation portion 606 determines in step S2002 that the suspension designation ON/OFF information 1901 is "ON" (YES in S2002), the process advances to step S1306.

In step S1306, the print command generation portion 606 notifies the display/operation portion 110 that the suspension designation is set "ON". Upon reception of this notification, the display/operation portion 110 displays, on the display screen of the host computer 101, a display to prompt the operator to set a print sheet at the manual feed port 305 for each page. In this case, the display/operation portion 110 displays, on the screen of the host computer 101, a message "please set a print sheet at the manual feed port and press [Paper] key." as shown in FIG. 11 (S1306).

The process advances to step S1307, and the print command generation portion 606 outputs, to a print control circuit 105, a display request (manual feed request information) to prompt the user to set a print sheet at the manual feed port 305. Then, a Paper LED 903 which prompts the operator to set a print sheet at the manual feed port 305 flickers in the printing apparatus 100.

In step S1308, the print control circuit 105 makes the print operation in the printing apparatus 100 stand by until the operator sets a print sheet at the manual feed port 305 and presses a Paper key 902 (FIG. 9).

In step S1309, if the Paper key 902 is pressed, the print control circuit 105 cancels the standby state of the printing apparatus 100. An instruction input by pressing the Paper key 902 is transmitted as print environment information from the print control circuit 105 to the host computer 101. Upon reception of the print environment information from the print environment detection portion 608, the display/operation portion 110 cancels the window display which prompts the operator to set a print sheet at the manual feed port 305, and turns off the Paper LED 903 in the printing apparatus 100.

In the above-described steps S2001, S2002, and S1306 to S1309, if the suspension designation is set "ON", preparations to print the current page are completed.

In step S1310, the print command generation portion 606 of the host computer 101 transfers 1-page compressed image data to the print control circuit 105 of the printing apparatus.

If transfer of the 1-page compressed image data ends, the process returns to step S1301. If all pages have been printed out, the process ends; if not all pages have been printed out, the process from step S1302 is repeated.

According to the second embodiment, the printing apparatus 100 (host-based printer) need not interpret an offline job command which is transmitted from the host computer 101 and controls printing for each page. The printing apparatus 100 controls the transfer start timing when the host computer 101 transfers, to the printing apparatus on the basis of suspension designation ON/OFF information, compressed image data of a target page and a display to prompt the operator to set a print sheet at the manual feed port. The print operation is suspended for an arbitrary page set in a series of document files, and printing can be reliably performed by feeding a print sheet from the manual feed port for an arbitrary page desired by the operator with the configuration of a low-end printing apparatus.

Third Embodiment

The first and second embodiments have described a case wherein the host computer 101 identifies data transfer permission representing that the user designates the Paper key in FIG. 9, and the host computer 101 transfers compressed image data of a given page to the printing apparatus 100.

However, the gist of the present invention is not limited to this configuration. For example, when the printing apparatus 100 comprises a memory sufficient to a certain degree, it is assumed that compressed image data of all or some pages are transmitted in advance from the host computer 101. In this case, the host computer 101 identifies information which is sent from the printing apparatus 100 in accordance with an instruction to the Paper key in FIG. 9 by the user and represents print data transfer permission. In accordance with the identification, the host computer 101 instructs the printing apparatus 100 to print print data transferred in advance. This print instruction can designate one or two surfaces of a print medium. For example, if a 2in1 layout process is set in the host computer 101, two logical pages are laid out on one surface.

FIG. 21 is a flowchart for explaining the flow of a print control process executed between a host computer 101 and a printing apparatus 100 according to the third embodiment. The same step numbers denote processes common to those in the flowchart of FIG. 13 according to the first embodiment. In step S2101, the host computer 101 generates print data, and stores compressed image data of a document to be printed in a spool file 702. In step S2102, the host computer 101 transfers spool data of the spool file 702 to the printing apparatus 100. As compressed image data transmitted in advance, the host computer 101 can transmit compressed image data of all or some pages in accordance with the memory of the printing apparatus 100.

As described in the first embodiment with reference to FIG. 13, processes in steps S1301 to S1309 are executed. If a Paper key 902 is pressed in step S1309, information representing transfer permission is sent from the printing apparatus 100 to the host computer 101.

In step S2103, the host computer 101 receives the information representing transfer permission, and instructs the printing apparatus 100 to print out one page. After the end of the 1-page printout instruction, the process returns to step S1301. If all pages have been printed out, the process ends; if not all pages have been printed out, the process from step S1302 is repeated.

The above-described flow of the process of FIG. 21 in the third embodiment can also be applied to FIG. 20 described in the second embodiment. In this case, similar to FIG. 21, processes corresponding to steps S2101 and S2102 may be executed before the process in step S1301 of FIG. 20, and a process corresponding to step S2103 of FIG. 21 may be executed in step S1310 of FIG. 20. An application to FIG. 20 overlaps with the description of FIG. 21, and a detailed description thereof will be omitted.

Other Embodiment

The above embodiments have been described on the basis of compressed or uncompressed image data, but data is not limited to image data as far as the data format can be applied to a host-based printer. Another data format may also be adopted as far as data transfer can be controlled for each page from the host.

The object of the present invention is achieved even by supplying a storage medium (or recording medium) which records software program codes to implement the functions of the above-described embodiments to the system or apparatus and causing the computer (or CPU or MPU) of the system or apparatus to read out and execute the program codes stored in the storage medium.

In this case, the program codes read out from the storage medium implement the functions of the above-described embodiments by themselves, and the storage medium which stores the program codes constitutes the present invention. The functions of the above-described embodiments are implemented not only when the readout program codes are executed by the computer but also when the operating system (OS) running on the computer performs some or all of actual processes on the basis of the instructions of the program codes.

The functions of the above-described embodiments are also implemented when the program codes read out from the storage medium are written in the memory of a function expansion card inserted into the computer or a function expansion unit connected to the computer, and the CPU of the function expansion card or function expansion unit performs some or all of actual processes on the basis of the instructions of the program codes.

When the present invention is applied to the storage medium, the storage medium stores program codes corresponding to the above-described flowcharts (FIGS. 13, 20, and 21).

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-166167 filed on Jun. 6, 2005, No. 2006-138239 filed on May 17, 2006 which are hereby incorporated by reference herein in their entirety.

What is claimed is:

1. An information processing apparatus which controls a host-based printer that can print each page of one print job on a print medium loaded in a cassette feed portion or a print medium inserted from a manual feed port on the basis of image data of each page and uses a common sensor to detect the print media loaded in the cassette feed portion and the manual feed port, comprising:
   a designation unit adapted to designate a page to suspend an operation of the host-based printer in order to print by changing a feed of the print medium loaded in the cassette feed portion into a feed of the print medium inserted from the manual feed port;
   a setting unit adapted to set, based on the designation result of said designation unit, suspension information indicating a page at which the operation of the host-based printer is suspended;
   a determination unit adapted to determine whether a page is one to which the suspension information is set when one print job is executed;
   a display control unit adapted to, when said determination unit determines that the page is one to which the suspension information is set, cause a display portion of the host-based printer to display a prompt for insertion of a print medium into the manual feed port;
   an identification unit adapted to, when said determination unit determines that the page is one to which the suspension information is set, identify a user instruction inputted at the host-based printer; and
   a transfer unit adapted to (i) transfer image data corresponding to the page to which the suspension information is set to the host-based printer on the basis of the identification by said identification unit, when said determination unit determines that the page is one to which the suspension information is set, and to (ii) transfer successively image data of a plurality of pages to the host-based printer, when said determination unit determines that the page is one to which the suspension information is not set,
   wherein in a process for image data of each page of the print job that has not been transferred to the host-based printer after a print process of the one corresponding to the page to which the suspension information is set,
   said determination unit determines whether a page is one to which the suspension information is set;
   said display control unit of the host-based printer causes the display portion to display again the display to prompt insertion of a print medium into the manual feed port when said determination unit determines again that the page is one to which the suspension information is set,
   said identification unit identifies again the user instruction inputted at the host-based printer, and
   said transfer unit transfers the image data of a following one corresponding page of the print job to be processed to the host-based printer on the basis of the identification by said identification unit.

2. The apparatus according to claim 1, wherein when said identification unit identifies the user instruction, said display control unit cancels the display to prompt insertion of a print medium into the manual feed port.

3. The apparatus according to claim 1, further comprising:
   a first designation information determination unit adapted to determine whether information containing the image data of each page contains designation information for controlling an operation of the host-based printer for each page; and
   a second designation information determination unit adapted to, when said first designation information determination unit determines that the information contains the designation information, determine whether a setting of suspending the operation of the host-based printer is set in the designation information,
   wherein when said second designation information determination unit determines that the setting of suspending the operation of the host-based printer is set in the designation information, said display control unit causes the display portion to display the display to prompt insertion of a print medium into the manual feed port, and
   wherein said transfer unit does not transfer corresponding image data until a notification representing image data transfer permission is received from the host-based printer.

4. The apparatus according to claim 1, wherein
   said identification unit identifies a notification output from the host-based printer in response to an instruction that insertion of a print sheet into the manual feed port is completed by a user in the host-based printer, and
   the notification includes a notification by a response to polling, an event notification, or a notification based on a voltage change at a signal destination.

5. An information processing method of controlling a host-based printer that can print each page of one print job on a print medium loaded in a cassette feed portion or a print medium inserted from a manual feed port on the basis of image data of each page and uses a common sensor to detect the print media loaded in the cassette feed portion and the manual feed port, comprising steps of:
   designating a page to suspend an operation of the host-based printer in order to print by changing a feed of the print medium loaded in the cassette feed portion into a feed of the print medium inserted from the manual feed port;
   setting, based on the designation result, suspension information indicating a page at which the operation of the host-based printer is suspended;
   determining a page to which the suspension information is set;
   first display controlling of, when the page to which the suspension information is set in the determining step to be designated, causing a display portion of the host-based printer to display a prompt to prompt insertion of a print medium into the manual feed port;

identifying, when said determining step determines that the page is one to which the suspension information is set, a user instruction inputted at the host-based printer;

controlling of causing the host-based printer to (i) output image data of one corresponding page to which the suspension information is set on the basis of the identification in the identifying step, when said determining step determines that the page is one to which the suspension information is set, and to (ii) transfer successively image data of a plurality of pages to the host-based printer, when said determining step determines that the page is one to which the suspension information is not set; and second display controlling of, in a process for image data of each page of the print job that has not been transferred to the host-based printer after a print process of the one corresponding page, causing the display portion of the host-based printer to display again the display to prompt insertion of a print medium into the manual feed port when said determining step determines again that the page is one to which the suspension information is set, identifying again the user instruction inputted at the host-based printer, and transferring the image data of a following one corresponding the page to which the suspension information is set of the print job to be processed to the host-based printer on the basis of the identification by said identification unit; and said determining step determines whether a page is one to which the suspension information is set.

6. The method according to claim 5, wherein when the user instruction is identified in the identifying step, the display to prompt insertion of a print medium into the manual feed port is canceled in the first display controlling step and the second display controlling step.

7. The method according to claim 5, further comprising a step of determining whether a setting of suspending an operation of the host-based printer is set in correspondence with each of a plurality of pages, wherein for a page determined in the determining step which is added the setting for suspending the operation of the host-based printer, the display portion is caused in the first display controlling step to display the display to prompt insertion of a print medium into the manual feed port, and no corresponding image data is transferred in the controlling step of causing the host-based printer until image data transfer permission is identified.

8. The method according to claim 5, wherein in the identifying step, a notification output from the host-based printer is identified in response to an instruction that insertion of a print sheet into the manual feed port is completed by a user in the host-based printer, and the notification includes a notification by a response to polling, an event notification, or a notification based on a voltage change at a signal destination.

9. A non-transitory computer readable storage medium which stores a program causing a computer to execute an information processing method defined in claim 5.

* * * * *